(12) United States Patent
LaFarelle et al.

(10) Patent No.: US 9,521,326 B2
(45) Date of Patent: *Dec. 13, 2016

(54) MISREGISTRATION CORRECTION USING NON-PINHOLE CAMERA MODEL AND NON-LINEAR SCAN EQUATIONS

(71) Applicant: Raytheon Company, Waltham, MA (US)

(72) Inventors: Sarah A. LaFarelle, Wylie, TX (US); Archie Henry Muse, Dallas, TX (US)

(73) Assignee: Raytheon Company, Waltham, MA (US)

(*) Notice: Subject to any disclaimer, the term of this patent is extended or adjusted under 35 U.S.C. 154(b) by 100 days.

This patent is subject to a terminal disclaimer.

(21) Appl. No.: 14/272,151

(22) Filed: May 7, 2014

(65) Prior Publication Data

US 2014/0333783 A1  Nov. 13, 2014

Related U.S. Application Data

(60) Provisional application No. 61/820,914, filed on May 8, 2013.

(51) Int. Cl.
*H04N 5/232* (2006.01)
*G01C 11/02* (2006.01)
(Continued)

(52) U.S. Cl.
CPC ......... *H04N 5/23267* (2013.01); *G01C 11/025* (2013.01); *G06T 5/003* (2013.01);
(Continued)

(58) Field of Classification Search
CPC ............. H04N 3/1525–3/1543; H04N 3/1581; H04N 3/1587; H04N 5/23248–5/2329; H04N 5/372–5/3728; G06T 7/20–7/2093; G01C 11/00

See application file for complete search history.

(56) References Cited

U.S. PATENT DOCUMENTS

2013/0011020 A1* 1/2013 Kamoshida ........ H04N 5/23267
                                                        382/107
2015/0319379 A1* 11/2015 Nussmeier ............... H04N 5/33
                                                        348/165

OTHER PUBLICATIONS

Mingyang et al., "Real-Time Motion Tracking on a Cellphone using Inertial Sensing and a Rolling-Shutter Camera", 2013 IEEE International Conference on Robotics and Automation (ICRA), Karisruhe, Germany May 6-10, 2013, pp. 4712-4719.

(Continued)

*Primary Examiner* — Paul Berardesca
(74) *Attorney, Agent, or Firm* — Burns & Levinson LLP; Joseph M. Maraia

(57) ABSTRACT

A method of misregistration correction in a line scanning imaging system includes: generating a model of scan motion over a focal plane of the imaging system, using a coupled system of non-linear scan equations with constant coefficients; estimating programmed motion positions across a plurality of detector junction overlap regions via a state transition matrix solution to the scan equations; at each detector junction overlap region, measuring actual motion positions via image correlation of overlapping detectors; generating differences between the actual motion positions and the estimated programmed motion positions; estimating updates to the constant coefficients based on the generated differences; generating corrections from the estimated updates to remove unwanted motion; and applying the updates to the constant coefficients.

13 Claims, 9 Drawing Sheets

(51) Int. Cl.
  *G06T 7/20* (2006.01)
  *H04N 5/372* (2011.01)
  *G06T 5/00* (2006.01)
(52) U.S. Cl.
  CPC ............ *G06T 5/006* (2013.01); *G06T 7/2033* (2013.01); *H04N 5/23254* (2013.01); *H04N 5/372* (2013.01); *G06T 2207/20201* (2013.01); *G06T 2207/30241* (2013.01)

(56) References Cited

OTHER PUBLICATIONS

Janschek et al., "Integrated Camera Motion Compensation by Real-Time Image Motion Tracking and Image Deconvolution", Proceedings of the 2005 IEEE/ASME, International Conference on Advanced Intellegent Mechatronics, Montery, CA Jul. 24-28, 2005, pp. 1437-1444.
Andrew W. Fitzgibbon, Simulataneous Linear Estimation of Multiple View Geometry and Lens Distortion, Proceedings of the 2001 IEEE Computer Vision and Pattern Recognition. vol. 1, Jan. 1, 2001 pp. 1-8.

* cited by examiner

MISREGISTRATION CORRECTION USING NON-PINHOLE CAMERA MODEL AND NON-LINEAR SCAN EQUATIONS

RELATED APPLICATION

This application claims the benefit of U.S. Provisional Patent Application No. 61/820,914, filed in the U.S. Patent and Trademark Office on May 8, 2013, the entire contents of which are incorporated herein by reference.

BACKGROUND

1. Technical Field

This disclosure relates to generation of images of remote objects and, more particularly, to generation of corrected images generated from a scanning sensor on a moving platform.

2. Discussion of Related Art

Using line scanning, an electro-optical sensor can acquire image data for a remote object while in motion. Support data associated with each acquisition by the sensor contains measurement histories for position, velocity, attitude angles and rates, and a priori error variances. Accurate support data is important to the image formation process, as errors can manifest themselves as geometric artifacts.

Misregistration correction (MRC) is a component in the image formation chain of a line scanning electro-optical sensor. MRC removes the geometric artifacts introduced by unprogrammed motion, which is unwanted motion not commanded as part of the image acquisition process. It can arise from vibrations, sensor attitude and position knowledge errors, etc.

SUMMARY

According to one aspect, a method of misregistration correction in a line scanning imaging system is provided. The method includes: generating a model of scan motion over a focal plane of the imaging system, using a coupled system of non-linear scan equations with constant coefficients; estimating programmed motion positions across a plurality of detector junction overlap regions via a state transition matrix solution to the scan equations; at each detector junction overlap region, measuring actual motion positions via image correlation of overlapping detectors; generating differences between the actual motion positions and the estimated programmed motion positions; estimating updates to the constant coefficients based on the generated differences; generating corrections from the estimated updates to remove unwanted motion; and applying the updates to the constant coefficients.

In some exemplary embodiments, estimating updates is performed using least-squares estimation. In some exemplary embodiments, the image correlation comprises normalized cross-correlation. In some exemplary embodiments, the image correlation comprises lag product cross-correlation. In some exemplary embodiments, the image correlation comprises least squares cross-correlation.

In some exemplary embodiments, the model of scan motion is generated over a predetermined time interval, In some exemplary embodiments, the scan equations comprise a set of differential equations with constant coefficients. In some exemplary embodiments, the differential equations are first-order differential equations.

In some exemplary embodiments, the method further includes computing the scan equation coefficients using sensor platform parameters. In some exemplary embodiments, the sensor platform parameters comprise at least one of sensor position, velocity, attitude angles and rates. In some exemplary embodiments, the method further includes approximating errors in the scan equation coefficients from measurement errors in the platform parameters. In some exemplary embodiments, the method further includes generating a covariance matrix of focal plane coordinate errors. In some exemplary embodiments, the method further includes estimating platform parameter errors from the differences between the actual motion positions and the estimated programmed motion positions.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

DETAILED DESCRIPTION

Figure 1:
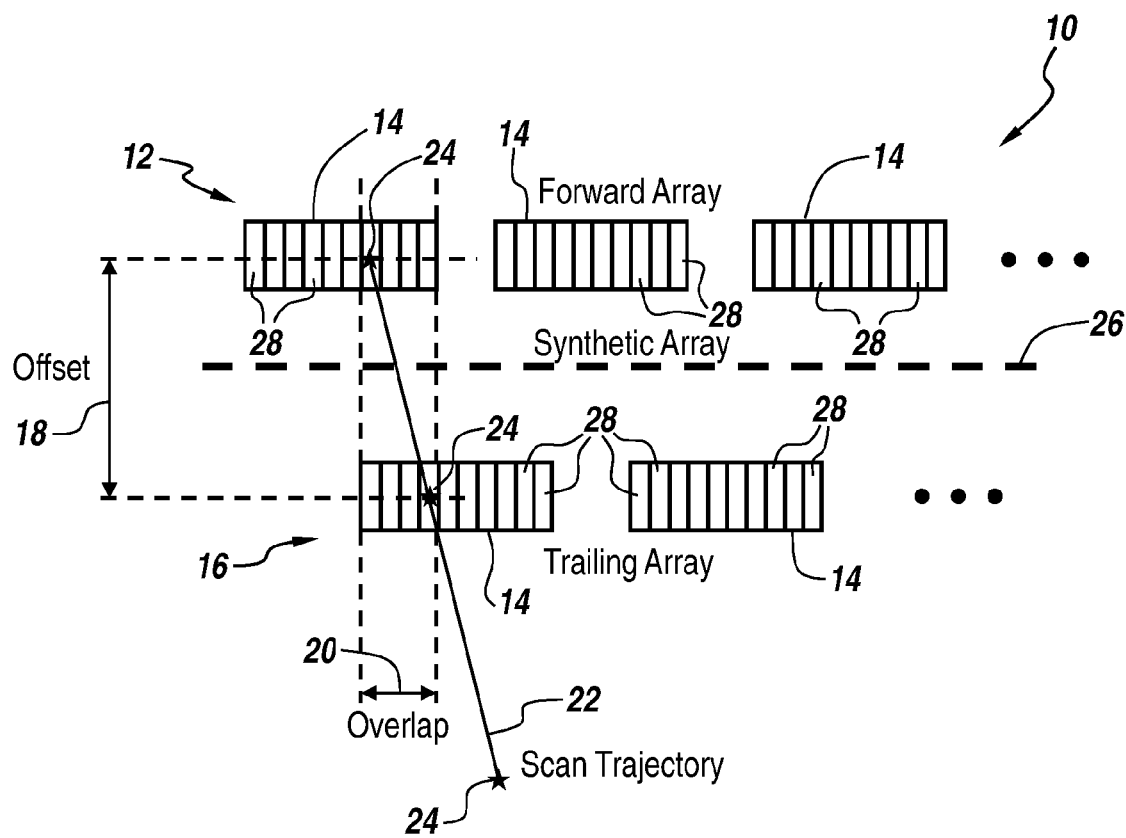
FIG. 1 includes a schematic diagram of a focal plane scanning geometry/configuration.

Some previous electro-optical line scanning sensors were modeled as pinhole cameras. Unknown amounts of system error are introduced using this approximation. As a result, new approaches have been developed for geometric corrections that do not adhere to the traditional model. An example is misregistration correction (MRC), which affects image quality. MRC removes geometric artifacts introduced by unprogrammed motion, which is unwanted motion not commanded as part of the image acquisition process. It can arise from vibrations, sensor attitude and position knowledge errors, etc. An innovative new approach for performing MRC is described herein. The approach described herein does not assume a pinhole camera model. It simultaneously estimates and corrects unprogrammed motion while enabling estimation of sensor knowledge errors in position, velocity, attitude angles, and attitude angle rates.

According to some exemplary embodiments, projections are formulated via bivariate polynomials curve fit to ray traced variations from a pinhole model. Differentiating these projection equations yields non-linear scan equations. A first-order Taylor series approximation reduces the scan equations to a coupled system of first-order differential equations with constant coefficients. Programmed motion positions across each detector junction are estimated via a state transition matrix solution. The actual motion positions are measured via correlation of the overlapping detectors and differenced with the predicted locations. A least-squares fit estimates updates to the scan coefficients based on these error residuals, to remove the unwanted motion.

According to some exemplary embodiments, error propagation is formulated via perturbations to the state transition matrix and forcing vector, which does not require that motion errors be estimated separately by category (rectilinear, oscillatory, and random); a robust and computationally efficient algorithm results. The rigorous error propagation model employed inherently characterizes statistical consistency, which enables identification of junction measurement "outliers," and reinforces robustness. The formulation of scan coefficient updates enables estimation of knowledge errors in sensor position, velocity, attitude angles, and attitude angle rates. Accuracy is enhanced by an iteration process based on these knowledge errors.

According to some exemplary embodiments, a covariance model relates scan coefficient errors to focal plane coordinate errors for non-linear scan equations. According to these embodiments, a line scanning electro-optical sensor that does not follow a pinhole model is considered. Given all the support data values necessary to define the scan (sensor position and velocity, attitude angles and rates) and the accuracy with which these parameters are known (mean errors, covariance), the error statistics (means, covariance) in the projected location of a ground point's image at some small time increment later in the scan are computed, via closed-form expressions. These statistics are performance-important for the image formation chain; specifically, the formulation of an effective geometric correction process.

According to some exemplary embodiments, the propagated coordinate errors are derived in terms of first-order error perturbations to the scan coefficients appearing in the state transition matrix and forcing vector. These scan coefficient errors arise from un-modeled vibrations and knowledge errors in the parameters employed to compute the coefficients. These scan coefficient errors are then determined via the detector junction measurement residuals. Next, closed-form approximations for the junction measurement residuals are derived from the measurement errors in the platform support parameters. Combining these steps completes the solution.

According to some exemplary embodiments, this new approach of the present disclosure produces an accurate expression for predicting the errors in the projected focal plane scan coordinates of a non-pinhole camera system. This is a major improvement over the known method of Monte Carlo simulation, which is computationally cumbersome. Also, this accurate solution enables on-the-fly computation of performance quality measures for band-to-band registered exploitation products. Such metrics are in demand by the user community. Also, the approach described herein enables on-the-fly statistical consistency and outlier checks for the junction measurements.

According to some exemplary embodiments, platform error estimation for non-linear scan equations is also provided. Unknown amounts of system error are introduced by modeling electro-optical line scanning sensors as pinhole cameras. Accurate support data, including measurement histories for position, velocity, attitude angles and rates, and a priori error variances, is important for removing geometric artifacts in the images captured by these sensors. Projected focal plane coordinate errors are estimated during image formation via a correlation process in the detector junction overlap regions across the array. The problem solved is that of estimating knowledge errors in the support data from these measured coordinate errors; thus, improving image quality.

According to some exemplary embodiments, one first accurately approximates the resulting focal plane coordinate errors arising from given random errors in the scan coefficients, as would be measured by the detector junction correlation process. These scan coefficient errors arise because the sensor support data employed in their computation contains measurement errors. One then derives expressions relating the scan coefficient errors to the measurement errors in the platform parameters (position, velocity, attitude angles and rates). These two intermediate expressions are then combined into a least-squares estimator relating measured detector junction coordinate residuals to platform parameter knowledge errors.

According to some exemplary embodiments, this new approach produces accurate estimates for platform parameter knowledge errors on a line-by-line basis. The improved accuracy of the platform parameters will positively impact image quality. The error estimates obtained from the initial execution of this approach yields error estimates that can be applied to improve the original platform parameter measurement histories. Subsequently, the updated histories can be iterated through another pass of junction measurements to further tighten overall knowledge accuracy. The approach of the exemplary embodiments facilitates on-the-fly statistical consistency and outlier checks for the junction measurement process.

Previous electro-optical line scanning systems are based on a post-correction pinhole camera model. Specifically, for these systems it was assumed that either corrections for optical distortion, atmospheric refraction, etc., had been successfully executed prior to formulation of the focal plane scan equations, or these correction terms were insignificant. The resulting linear scan equations were employed to implement a multi-stage misregistration correction (MRC) approach. This disclosure describes an original method for implementing a MRC approach for an electro-optical line scanning sensor, which cannot be modeled as a pinhole camera.

The MRC approach of the present disclosure treats total error without the need for separately estimating linear, oscillatory and random errors. Its formulation is mathematically rigorous and computationally robust. The rigorous error propagation model employed in the approach described herein characterizes statistical consistency, which enables identification of junction measurement "outliers," and reinforces robustness. Its formulation of scan coefficient updates enables estimation of knowledge errors in sensor position, velocity, attitude angles, and attitude angle rates via an inversion process. Accuracy is further enhanced by an iteration process based on these knowledge errors.

According to the present disclosure, an approach is presented for mathematically modeling the non-linear variations from a pinhole model present in ray trace data characterizing the sensor optics via bivariate polynomial curve fits. These polynomial variation models are employed to derive the focal plane scan equations, which define the focal plane trajectory traced by the image of a specific point in object space during the scan. The resulting scan equations are a pair of coupled 1st-order non-linear differential equations.

According to the exemplary embodiments, an accurate approximation is then introduced that reduces the non-linear differential equations to a set of linear differential equations, and which preserves the significant non-pinhole characteristics of the camera model. The solution to these approximate scan equations yield an error propagation model, which describes the flow of knowledge errors in the sensor position, velocity, attitude angles and rates into coordinate errors in the predicted position of an image point. These coordinate errors are measured via a correlation process in the detector junction overlap regions.

According to some exemplary embodiments, the junction measurements serve as inputs into a least-squares process, which is based on the error flow model. The least-squares process yields error estimates to the nominal scan coefficients, which are consistent with the measured coordinate residuals. It is these scan coefficient errors that are employed to affect MRC. An inversion process derives estimates of knowledge errors in the sensor position, velocity, attitude angles and rates from the scan coefficient error updates. The MRC process feeds back the knowledge errors into the a priori platform support data and then iterates the MRC solution.

A typical traditional MRC approach is now described as a reference point for the detailed description of the approach of the exemplary embodiments, which begins in section 1 below.

In terms of nomenclature, the term "programmed motion" used herein refers to commanded motion that is planned as part of the sensor's image acquisition process. Specifically, it is the motion of the image of a selected stationary ground point across the focal plane during a commanded scan. The terms "unprogrammed motion," "image motion error" or "focal plane coordinate errors" refer to the motion of the image of a selected stationary ground point across the focal plane, which differs from the commanded motion, and can occur due to attitude errors, vibrations, or a number of other causes.

Many prior electro-optical line scanning sensor systems have been based on a post-correction pinhole camera model. Specifically, these systems assume that either corrections for optical distortion, atmospheric refraction, etc., have been successfully executed prior to formulation of the focal plane scan equations, or these correction terms were insignificant. The resulting linear scan equations were employed to implement a multi-stage MRC approach.

The scan equations were derived by direct differentiation of the pinhole camera projection equations with respect to time. All pinhole camera model parameters were allowed to vary with time except for the coordinates of the ground point of interest, camera focal length, and the camera principal point coordinates. The resulting scan equations were a coupled system of linear, first-order differential equations with six time varying coefficients. Ideally, one would supply the time histories of the sensor position, velocity, attitude angles, and attitude angle rates, compute the scan six time varying coefficients, and solve the system of differential equations.

In general these differential equations were found to be a difficult, if not impossible, problem to solve in closed form without simplifying assumptions. The simplifying assumption that was adopted is to consider a time increment sufficiently small to ensure that one can accurately consider the computed scan coefficients to be constant over this interval. One then solves the resulting equations and utilizes this solution until the time constraint has been reached. One then repeats the process until the entire time period has been covered increment-by-increment.

FIG. 1 includes a schematic diagram of a focal plane scanning geometry/configuration. The scan configuration 10 includes a forward array 12 of sensor modules 14 and a trailing array 16 of sensor modules 14. Each sensor module 14 includes a plurality of sensors 28 disposed linearly. The sensor modules 14 of the forward array 12 are staggered with respect to the sensor modules 14 of the trailing array 16, such that an overlap 20 of sensor modules is created. The forward array 12 and trailing array 16 are offset by an offset 18. Through appropriate processing of received sensor data, the forward array 12 and trailing array 16 combine to form a synthetic array 26, as shown in phantom in FIG. 1. During scanning image data collection, an object 24 is first detected by the forward array 12, and, due to the motion of the sensor platform, the object 24 is then detected by trailing array 16. The object 24 follows a scan trajectory 22 along the arrays 12 and 16. Previous approaches involved electro-optical line scanning sensors with offset and overlapping detector placements, as illustrated in FIG. 1.

The solution to the scan equations was employed to predict the object crossing points of the leading (forward) array 12 and the trailing array 16 of the scan trajectory 22 of an image point. The correlated detector responses of the forward and trailing arrays within each overlap region 20 determined the actual shift in positions of the crossing points. Variations between the predicted and the measured shifts would be used to estimate the impact of any unplanned motion present, and correct for it during formation of the synthetic image array.

Figure 2:
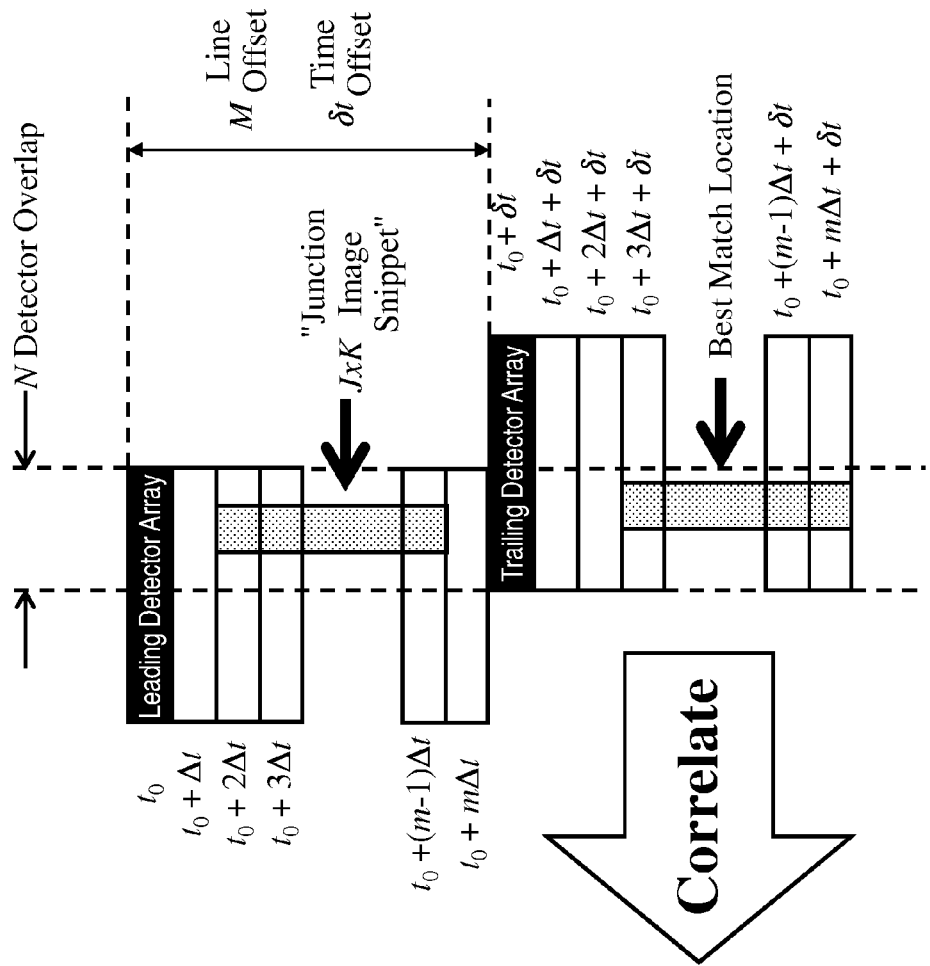
FIG. 2 is a schematic functional flow diagram of a detector junction correlation process.
Figure 2:
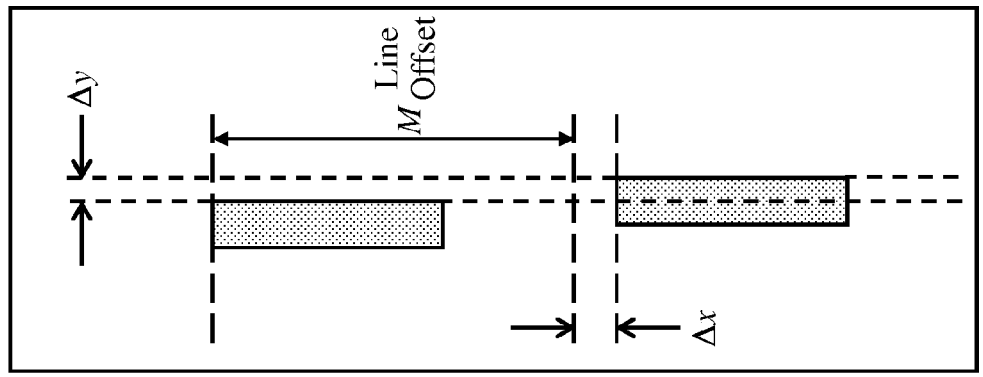

One exemplary detector junction correlation process is illustrated in FIG. 2, which is a schematic functional flow diagram of a detector junction correlation process. The correlation process relies on the fact that the leading and trailing arrays "see" the same image but at different times. The correlator can be a normalized cross correlator, a lag product cross correlator, a least squares cross correlator, or other known cross correlator. The image correlator is used to determine where a selected portion of the image viewed by the leading array 12 best aligns with the image seen by the trailing array 16. This provides a measured set of focal plane coordinates that can be compared with coordinates that were predicted via the scan equation solution using support data parameters.

Figure 3:
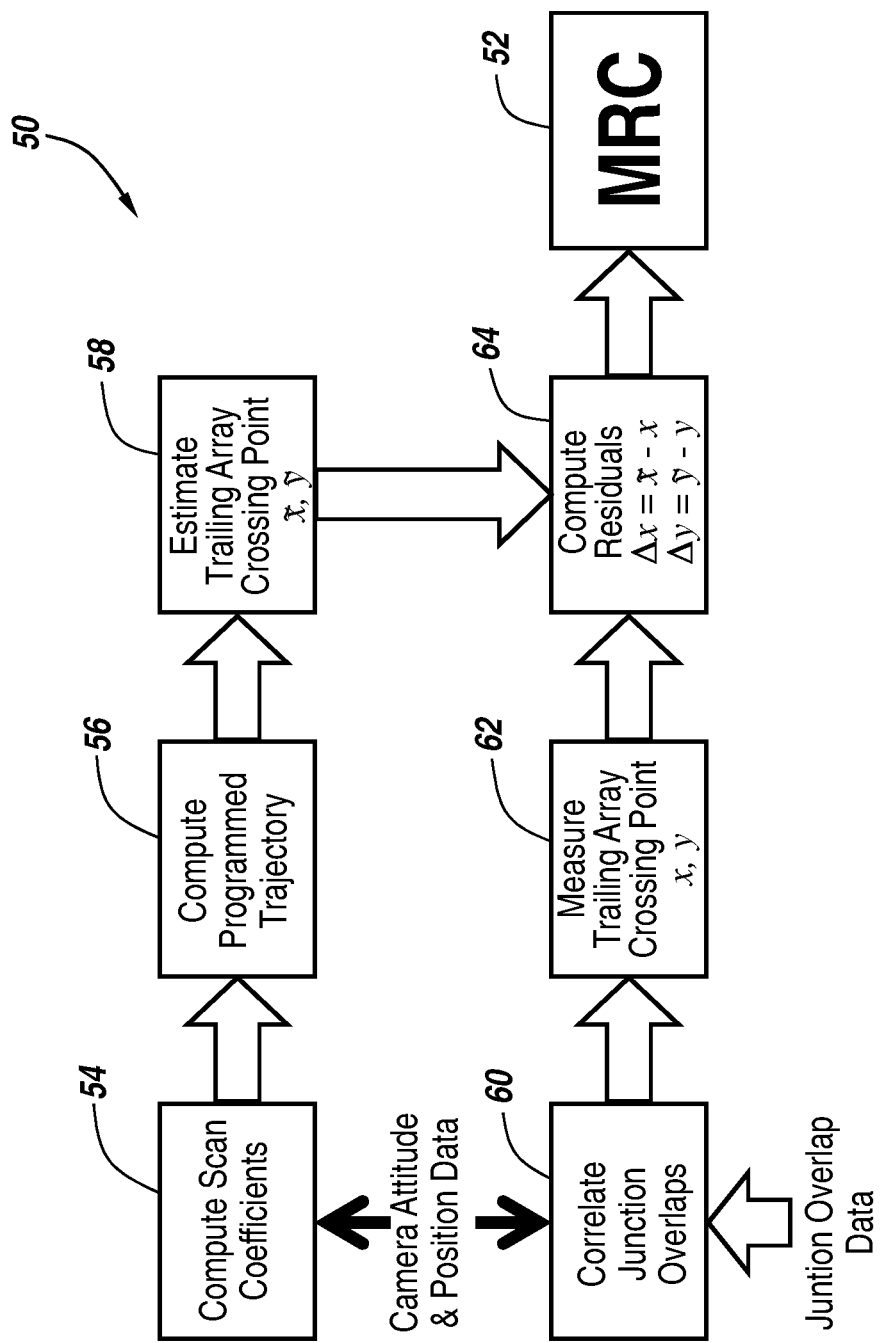
FIG. 3 includes a schematic functional block diagram of a detector junction measurement process.

In general, the highest measurable spatial frequency of a motion disturbance is a function of line rate and array separation. FIG. 3 includes a schematic functional block diagram of the detector junction measurement process 50. According to the process 50, the difference between the measured and predicted focal plane coordinates feed the MRC process. Referring to FIG. 3, scan coefficients are computed 54, using camera attitude and position data. Using the computed scan coefficients, programmed trajectory is also computed 56. Using the computed programmed trajectory, the trailing array crossing point is estimated 58. In parallel, also using camera attitude and position data as well as the junction overlap data, junction overlaps are correlated 60. Using the correlation of the junction overlaps, the trailing array crossing point is measured 62. The differences or residuals between the trailing array crossing estimate 58 and the measured trailing array crossing point are computed 64. As noted above, these differences or residuals are fed to the MRC process 52.

Thus, in previous approaches, the focal plane coordinate error residuals obtained from the detector junction measurements were exploited to estimate the amount of unprogrammed motion due to unwanted linear, oscillatory, and random motion. The quantified amount of unprogrammed motion in these categories was then "corrected" when forming the synthetic image array: The unwanted displacements were subtracted out when mapping the synthetic array interpolation locations.

In the following sections numbered 1 through 7, preferred embodiments which overcome drawbacks and disadvantages of the previous approaches are described in detail.

1 Non-Pinhole Camera Variation Models

Figure 4:
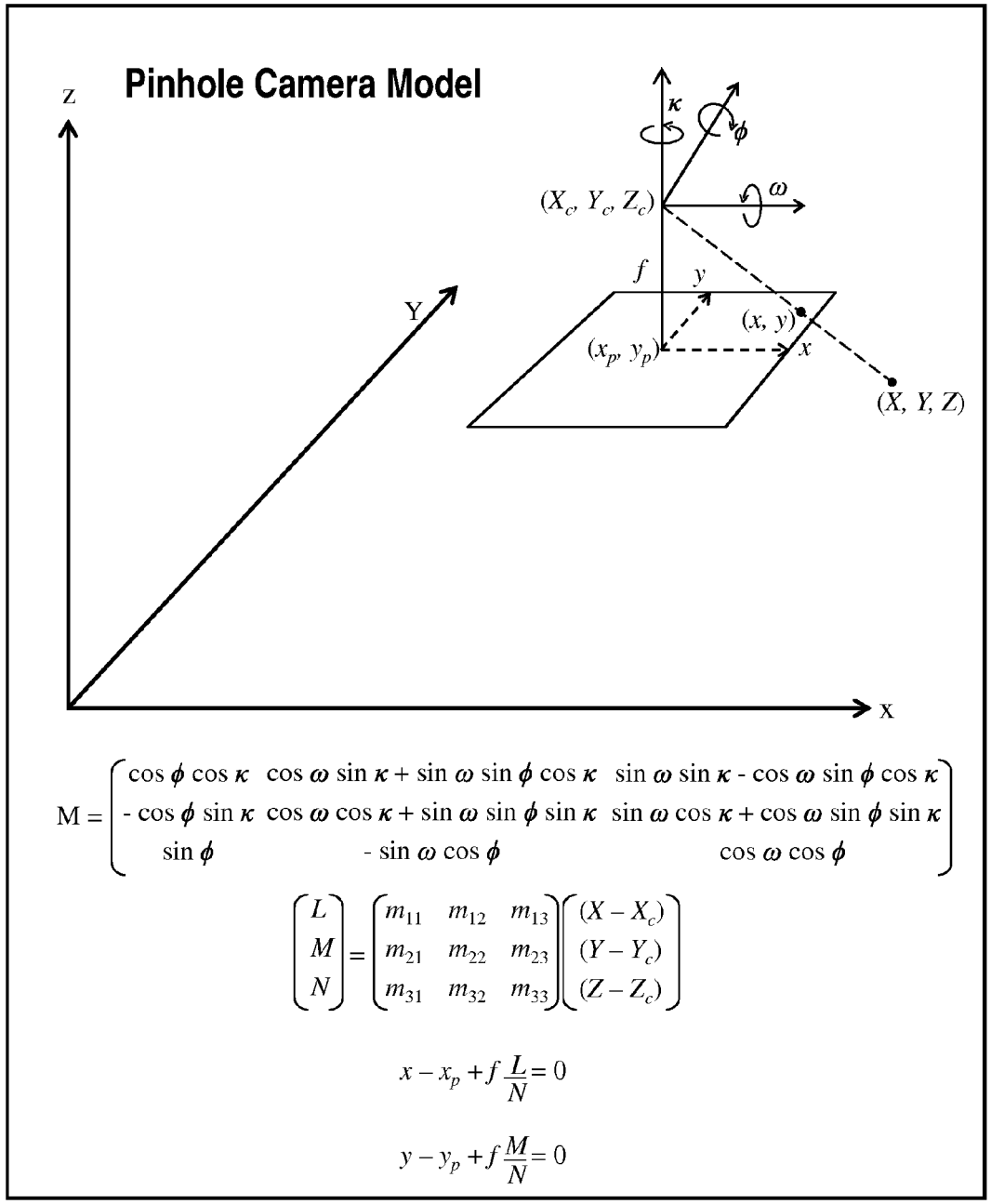
FIG. 4 is a schematic diagram of traditional pinhole camera projection equations.

FIG. 4 is a schematic diagram of traditional pinhole camera model and projection equations. The pinhole camera model yields linear scan equations. However, it is unknown how much error is introduced into the system by using this traditional simplified model. It would be beneficial to construct a system of non-linear scan equations to evaluate the errors introduced by the traditional pinhole camera model. A non-linear model of the projection equations is numerically determined from ray trace data in accordance with the following.

Figure 5:
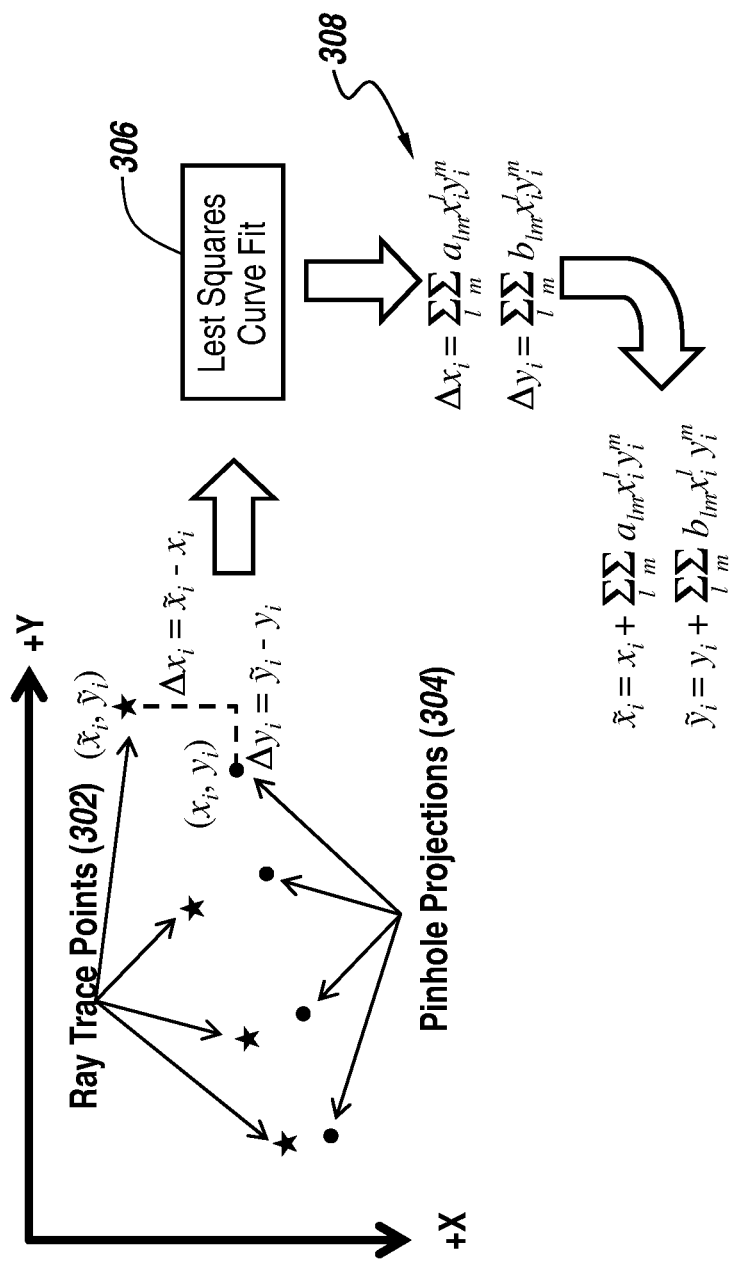
FIG. 5 includes a schematic logical flow diagram of generating correction terms to be added to the traditional pinhole camera model, according to some exemplary embodiments.

FIG. 5 includes a schematic logical flow diagram of generating correction terms to be added to the traditional pinhole camera model, according to some exemplary embodiments. Referring to FIG. 5, ray traced points 302 through the optics are compared with locations 304 predicted from a pinhole model. The position residuals are then least-squares curve fit 306 to bivariate polynomial expressions to obtain correction terms 308 to be added to the traditional pinhole model. The order of the polynomial fit required to accurately model the variation from a pinhole camera may vary from design to design but the principle is the same. Once an accurate polynomial representation has been found; the numerical coefficients of the polynomial fit characterize the system's variation from a pinhole camera. In designs that allow for focus variation, it may be necessary to generate a set of polynomials for several different focus ranges.

The MRC approach described herein will work for polynomials of any degree. However, in order to avoid unnecessary abstraction and to make the mathematics easier to follow, the following quadratic bivariate polynomials are featured:

$$\Delta x = a_{00} + a_{01}y + a_{02}y^2 + a_{10}x + a_{11}xy + a_{20}x^2 \qquad \text{Eq. 1-1a}$$

$$\Delta x = b_{00} + b_{01}y + b_{02}y^2 + b_{10}x + b_{11}xy + b_{20}x^2 \qquad \text{Eq. 1-1b}$$

This quadratic model provides six coefficients to represent the variation from a pinhole camera in each of two coordinates; for a total of twelve real-valued coefficients.
Hence, the non-pinhole camera projection equations are:

$$x - x_p + f\frac{L}{N} + a_{00} + a_{01}y + a_{02}y^2 + a_{10}x + a_{11}xy + a_{20}x^2 = 0 \qquad \text{Eq. 1-2a}$$

$$y - y_p + f\frac{M}{N} + b_{00} + b_{01}y + b_{02}y^2 + b_{10}x + b_{11}xy + b_{20}x^2 = 0 \qquad \text{Eq. 1-2b}$$

2 Non-Linear Scan Equations

The scan equations are derived by direct differentiation of the non-pinhole camera projection equations with respect to time. All the parameters of the non-pinhole camera model are allowed to vary with time except for the coordinates of the ground point of interest, camera focal length, the polynomial coefficients of the variation models, and the camera principal point coordinates.

Differentiating equation 1-2 with respect to time yields:

$$\frac{dx}{dt} + \left(f\frac{L}{N}\right)\left[\frac{1}{L}\frac{dL}{dt} - \frac{1}{N}\frac{dN}{dt}\right] + a_{01}\frac{dy}{dt} + 2a_{02}y\frac{dy}{dt} + \qquad \text{Eq. 2-1a}$$
$$a_{10}\frac{dx}{dt} + a_{11}\frac{dx}{dt}y + a_{11}x\frac{dy}{dt} + a_{20}2x\frac{dx}{dt} = 0$$

$$\frac{dy}{dt} + \left(f\frac{M}{N}\right)\left[\frac{1}{M}\frac{dM}{dt} - \frac{1}{N}\frac{dN}{dt}\right] + b_{01}\frac{dy}{dt} + 2b_{02}y\frac{dy}{dt} + \qquad \text{Eq. 2-1b}$$
$$b_{10}\frac{dx}{dt} + b_{11}\frac{dx}{dt}y + b_{11}x\frac{dy}{dt} + b_{20}2x\frac{dx}{dt} = 0$$

These expressions may be immediately simplified to:

$$\left(f\frac{L}{N}\right)\left[\frac{1}{L}\frac{dL}{dt} - \frac{1}{N}\frac{dN}{dt}\right] + \qquad \text{Eq. 2-2a}$$
$$\frac{dy}{dt}(a_{01} + 2a_{02}y + a_{11}x) + \frac{dx}{dt}(1 + a_{10} + a_{11}y + a_{20}2x) = 0$$

$$\left(f\frac{M}{N}\right)\left[\frac{1}{M}\frac{dM}{dt} - \frac{1}{N}\frac{dN}{dt}\right] + \qquad \text{Eq. 2-2b}$$
$$\frac{dy}{dt}(1 + b_{01} + 2b_{02}y + b_{11}x) + \frac{dx}{dt}(b_{10} + b_{11}y + b_{20}2x) = 0$$

Rearranging terms yields:

$$(a_{01} + 2a_{02}y + a_{11}x)\frac{dy}{dt} + (1 + a_{10} + a_{11}y + a_{20}2x)\frac{dx}{dt} = \qquad \text{Eq. 2-3a}$$
$$-\left(f\frac{L}{N}\right)\left[\frac{1}{L}\frac{dL}{dt} - \frac{1}{N}\frac{dN}{dt}\right]$$

$$(1 + b_{01} + 2b_{02}y + b_{11}x)\frac{dy}{dt} + (b_{10} + b_{11}y + b_{20}2x)\frac{dx}{dt} = \qquad \text{Eq. 2-3b}$$
$$-\left(f\frac{M}{N}\right)\left[\frac{1}{M}\frac{dM}{dt} - \frac{1}{N}\frac{dN}{dt}\right]$$

Equations 2-3a and 2-3b may be rewritten in matrix form as:

$$\begin{pmatrix} (1 + a_{10} + a_{11}y + a_{20}2x) & (a_{01} + 2a_{02}y + a_{11}x) \\ (b_{10} + b_{11}y + b_{20}2x) & (1 + b_{01} + 2b_{02}y + b_{11}x) \end{pmatrix} \begin{pmatrix} \frac{dx}{dt} \\ \frac{dy}{dt} \end{pmatrix} = \qquad \text{Eq. 2-4}$$
$$\begin{pmatrix} -\left(f\frac{L}{N}\right)\left[\frac{1}{L}\frac{dL}{dt} - \frac{1}{N}\frac{dN}{dt}\right] \\ -\left(f\frac{M}{N}\right)\left[\frac{1}{M}\frac{dM}{dt} - \frac{1}{N}\frac{dN}{dt}\right] \end{pmatrix}$$

Thus, assuming the indicated matrix is invertible, one may write that:

$$\begin{pmatrix} \frac{dx}{dt} \\ \frac{dy}{dt} \end{pmatrix} = \begin{pmatrix} (1 + a_{10} + a_{11}y + a_{20}2x) & (a_{01} + 2a_{02}y + a_{11}x) \\ (b_{10} + b_{11}y + b_{20}2x) & (1 + b_{01} + 2b_{02}y + b_{11}x) \end{pmatrix}^{-1} \qquad \text{Eq. 2-5}$$
$$\begin{pmatrix} -\left(f\frac{L}{N}\right)\left[\frac{1}{L}\frac{dL}{dt} - \frac{1}{N}\frac{dN}{dt}\right] \\ -\left(f\frac{M}{N}\right)\left[\frac{1}{M}\frac{dM}{dt} - \frac{1}{N}\frac{dN}{dt}\right] \end{pmatrix}$$

Figure 6:
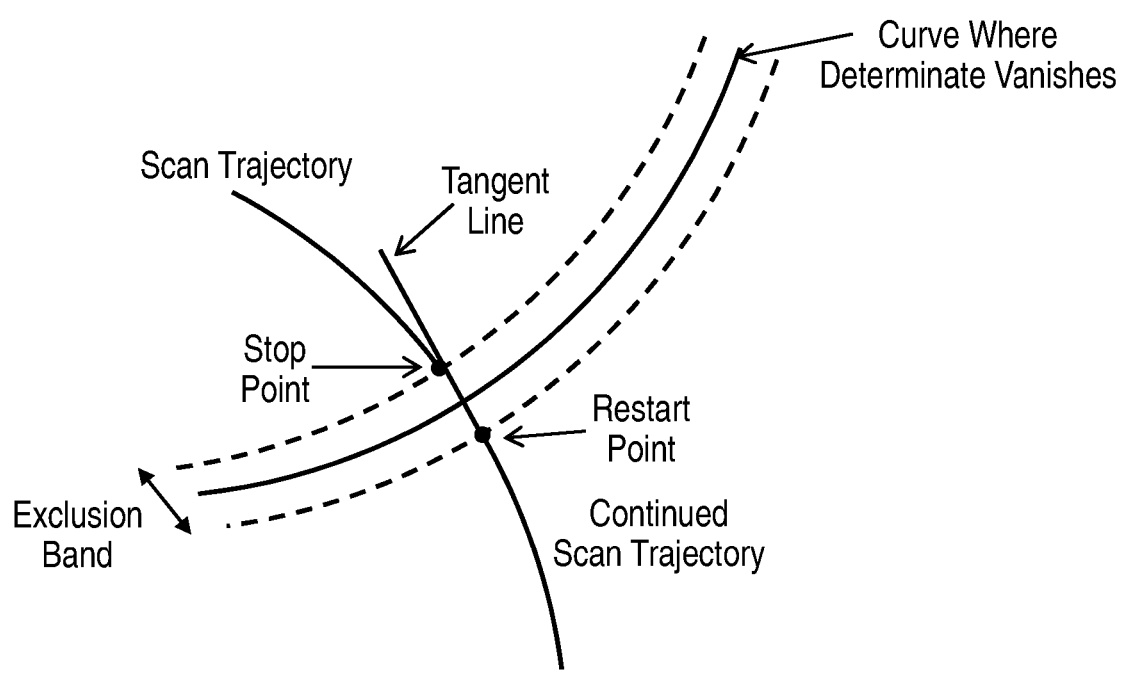
FIG. 6 includes a schematic diagram of an approach to working around a singularity issue, according to some exemplary embodiments.

Determining whether or not the matrix is invertible would require specification of particular values for the polynomial coefficients. However, a quick glance at the matrix reveals that its determinate is a quadratic bivariate polynomial. Setting this expression equal to zero will result in a quadratic plane curve. The near linear, short-scan trajectories of interest here are likely only to cross this forbidden curve in at most two places. FIG. 6 includes a schematic diagram of an approach to working around this singularity issue, according to some exemplary embodiments. Referring to FIG. 6, one can "work around" these singularity problem points by stopping the projected scan trajectory at a stop point just short of the singular point and extending the solution past it by a simple linear segment whose slope matches the scan trajectory's first derivative at the stop point, i.e., a tangent line. The solution is then picked up after a small time increment, i.e., across an exclusion band, on the other side.

For a 2×2 matrix, the inverse is given by:

$$\begin{pmatrix} a & b \\ c & d \end{pmatrix}^{-1} = \frac{1}{ad-bc}\begin{pmatrix} d & -b \\ -c & a \end{pmatrix} \quad \text{Eq. 2-6}$$

Consequently, $$\begin{pmatrix} \frac{dx}{dt} \\ \frac{dy}{dt} \end{pmatrix} = \left(\frac{1}{E(x,y)}\right)\begin{pmatrix} D(x,y) & -B(x,y) \\ -C(x,y) & A(x,y) \end{pmatrix} \quad \text{Eq. 2-7a}$$

$$\begin{pmatrix} -\left(f\frac{L}{N}\right)\left[\frac{1}{L}\frac{dL}{dt} - \frac{1}{N}\frac{dN}{dt}\right] \\ -\left(f\frac{M}{N}\right)\left[\frac{1}{M}\frac{dM}{dt} - \frac{1}{N}\frac{dN}{dt}\right] \end{pmatrix}$$

$$A(x,y) = (1 + a_{10} + a_{11}y + a_{20}2x) \quad \text{Eq. 2-7b}$$

$$B(x,y) = (a_{01} + 2a_{02}y + a_{11}x) \quad \text{Eq. 2-7c}$$

$$C(x,y) = (b_{10} + b_{11}y + b_{20}2x) \quad \text{Eq. 2-7d}$$

$$D(x,y) = (1 + b_{01} + 2b_{02}y + b_{11}x) \quad \text{Eq. 2-7e}$$

$$E(x,y) = A(x,y)D(x,y) - B(x,y)C(x,y) \quad \text{Eq. 2-7f}$$

Now, let $$P(t) = -\left(f\frac{L}{N}\right)\left[\frac{1}{L}\frac{dL}{dt} - \frac{1}{N}\frac{dN}{dt}\right] \quad \text{Eq. 2-8a}$$

$$Q(t) = -\left(f\frac{M}{N}\right)\left[\frac{1}{M}\frac{dM}{dt} - \frac{1}{N}\frac{dN}{dt}\right] \quad \text{Eq. 2-8b}$$

Equation 2-7a then becomes $$\begin{pmatrix} \frac{dx}{dt} \\ \frac{dy}{dt} \end{pmatrix} = \begin{pmatrix} \frac{D(x,y)}{E(x,y)}P(t) - \frac{B(x,y)}{E(x,y)}Q(t) \\ -\frac{C(x,y)}{E(x,y)}P(t) + \frac{A(x,y)}{E(x,y)}Q(t) \end{pmatrix} \quad \text{Eq. 2-9}$$

Thus the scan equation 2-9 is a couple system of first order, non-linear differential equations. Practically speaking, such equations can rarely be solved in closed form. Consequently, an accurate approximation is required that can (1) capture the significant non-pinhole character of the projection equations and (2) that leads to a soluble system. Such an approximation is provided in the next section.

3 An Approximate Solution

Exemplary desired initial conditions are selected: a point in the focal plane $(x_0, y_0)$ at time $t_0$. There exists a time increment and associated neighborhood of $N(x_0, y_0)$ for which one may approximate to the first order (bivariate Taylor's series):

$$P(t) \approx P(t_0) \quad t \in [t_0, t_0 + \Delta\tau] \quad \text{Eq. 3-1a}$$

$$Q(t) \approx Q(t_0) \quad t \in [t_0, t_0 + \Delta\tau] \quad \text{Eq. 3-1b}$$

$$N(x_0, y_0) = \left\{(x,y) \,\Big|\, \sqrt{(x-x_0)^2 + (x-x_0)^2} \leq R_0\right\} \quad \text{Eq. 3-1c}$$

$$\frac{D(x,y)}{E(x,y)} \approx \frac{D(x_0,y_0)}{E(x_0,y_0)} + \left[\frac{\partial}{\partial x}\left(\frac{D(x,y)}{E(x,y)}\right)_{(x_0,y_0)}\right](x-x_0) + \left[\frac{\partial}{\partial y}\left(\frac{D(x,y)}{E(x,y)}\right)_{(x_0,y_0)}\right](y-y_0) \quad \text{Eq. 3-1d}$$

$$\frac{B(x,y)}{E(x,y)} \approx \frac{B(x_0,y_0)}{E(x_0,y_0)} + \left[\frac{\partial}{\partial x}\left(\frac{B(x,y)}{E(x,y)}\right)_{(x_0,y_0)}\right](x-x_0) + \left[\frac{\partial}{\partial y}\left(\frac{B(x,y)}{E(x,y)}\right)_{(x_0,y_0)}\right](y-y_0) \quad \text{Eq. 3-1e}$$

$$\frac{C(x,y)}{E(x,y)} \approx \frac{C(x_0,y_0)}{E(x_0,y_0)} + \left[\frac{\partial}{\partial x}\left(\frac{C(x,y)}{E(x,y)}\right)_{(x_0,y_0)}\right](x-x_0) + \left[\frac{\partial}{\partial y}\left(\frac{C(x,y)}{E(x,y)}\right)_{(x_0,y_0)}\right](y-y_0) \quad \text{Eq. 3-1f}$$

$$\frac{A(x,y)}{E(x,y)} \approx \frac{A(x_0,y_0)}{E(x_0,y_0)} + \left[\frac{\partial}{\partial x}\left(\frac{A(x,y)}{E(x,y)}\right)_{(x_0,y_0)}\right](x-x_0) + \left[\frac{\partial}{\partial y}\left(\frac{A(x,y)}{E(x,y)}\right)_{(x_0,y_0)}\right](y-y_0) \quad \text{Eq. 3-1g}$$

Substituting Equations 3-1a through 3-1g into Equation 2-9 and setting $$\Gamma_1 = \left[\frac{\partial}{\partial x}\left(\frac{D(x,y)}{E(x,y)}\right)_{(x_0,y_0)}\right]P(t_0) - \left[\frac{\partial}{\partial x}\left(\frac{B(x,y)}{E(x,y)}\right)_{(x_0,y_0)}\right]Q(t_0) \quad \text{Eq. 3-2a}$$

$$\Gamma_2 = \left[\frac{\partial}{\partial y}\left(\frac{D(x,y)}{E(x,y)}\right)_{(x_0,y_0)}\right]P(t_0) - \left[\frac{\partial}{\partial y}\left(\frac{B(x,y)}{E(x,y)}\right)_{(x_0,y_0)}\right]Q(t_0) \quad \text{Eq. 3-2b}$$

$$\Gamma_3 = \frac{D(x_0,y_0)}{E(x_0,y_0)}P(t_0) - \frac{B(x_0,y_0)}{E(x_0,y_0)}Q(t_0) - \left[\frac{\partial}{\partial x}\left(\frac{D(x,y)}{E(x,y)}\right)_{(x_0,y_0)}\right]P(t_0)x_0 + \left[\frac{\partial}{\partial x}\left(\frac{B(x,y)}{E(x,y)}\right)_{(x_0,y_0)}\right]Q(t_0)x_0 - \left[\frac{\partial}{\partial y}\left(\frac{D(x,y)}{E(x,y)}\right)_{(x_0,y_0)}\right]P(t_0)y_0 + \left[\frac{\partial}{\partial y}\left(\frac{B(x,y)}{E(x,y)}\right)_{(x_0,y_0)}\right]Q(t_0)y_0 \quad \text{Eq. 3-2c}$$

$$\Gamma_4 = -\left[\frac{\partial}{\partial x}\left(\frac{C(x,y)}{E(x,y)}\right)_{(x_0,y_0)}\right]P(t_0) + \left[\frac{\partial}{\partial x}\left(\frac{A(x,y)}{E(x,y)}\right)_{(x_0,y_0)}\right]Q(t_0) \quad \text{Eq. 3-2d}$$

$$\Gamma_5 = -\left[\frac{\partial}{\partial y}\left(\frac{C(x,y)}{E(x,y)}\right)_{(x_0,y_0)}\right]P(t_0) + \left[\frac{\partial}{\partial y}\left(\frac{A(x,y)}{E(x,y)}\right)_{(x_0,y_0)}\right]Q(t_0) \quad \text{Eq. 3-2e}$$

-continued $$\Gamma_6 = -\frac{C(x_0, y_0)}{E(x_0, y_0)}P(t_0) + \frac{A(x_0, y_0)}{E(x_0, y_0)}Q(t_0) + \quad \text{Eq. 3-2f}$$

$$\left[\frac{\partial}{\partial x}\left(\frac{C(x, y)}{E(x, y)}\right)_{(x_0, y_0)}\right]P(t_0)x_0 - \left[\frac{\partial}{\partial x}\left(\frac{A(x, y)}{E(x, y)}\right)_{(x_0, y_0)}\right]Q(t_0)x_0 +$$

$$\left[\frac{\partial}{\partial y}\left(\frac{C(x, y)}{E(x, y)}\right)_{(x_0, y_0)}\right]P(t_0)y_0 - \left[\frac{\partial}{\partial y}\left(\frac{A(x, y)}{E(x, y)}\right)_{(x_0, y_0)}\right]Q(t_0)y_0$$

Allows the scan equation 2-9 to be rewritten in the form:

$$\begin{pmatrix}\frac{dx}{dt}\\\frac{dy}{dt}\end{pmatrix} = \begin{pmatrix}\Gamma_1 x + \Gamma_2 y + \Gamma_3 \\ \Gamma_4 x + \Gamma_5 y + \Gamma_6\end{pmatrix} = \begin{pmatrix}\Gamma_1 & \Gamma_2 \\ \Gamma_4 & \Gamma_5\end{pmatrix}\begin{pmatrix}x\\y\end{pmatrix} + \begin{pmatrix}\Gamma_3\\\Gamma_6\end{pmatrix} \quad \text{Eq. 3-2g}$$

Here $\Gamma_1, \ldots \Gamma_6$ are constant coefficients. Hence, the approximate scan equations constitute a coupled system of first order differential equations with constant coefficients. One may now rewrite the scan equations in matrix form as:

$$\frac{d}{dt}\vec{s}(t) = \Lambda_{2\times 2}\vec{s}(t) + \vec{F} \quad \text{Eq. 3-3a}$$

$$\vec{s}(t) = \begin{pmatrix}x(t)\\y(t)\end{pmatrix} \quad \text{Eq. 3-3b}$$

$$\Lambda_{2\times 2} = \begin{pmatrix}\Gamma_1 & \Gamma_2\\\Gamma_4 & \Gamma_5\end{pmatrix} \quad \text{Eq. 3-3c}$$

$$\vec{F} = \begin{pmatrix}\Gamma_3\\\Gamma_6\end{pmatrix} \quad \text{Eq. 3-3d}$$

It is noted that each of the scan coefficients $\Gamma_1, \ldots \Gamma_6$ depends on all the polynomial coefficients of the variation models, and thus these scan coefficients reflect the significant contributions of the non-pinhole projection equations.

There are numerous mathematical techniques for solving such a system including: matrix methods, the Laplace transform, method of elimination, etc. Employing matrix methods one can show that the solution to equation 3-3 is:

$$\vec{s}(t) = e^{\Lambda(t-t_0)}\vec{s}(t_0) + \int_{t_0}^{t} e^{\Lambda(t-\zeta)}\vec{F}\,d\zeta \quad \text{Eq. 3-4}$$

It is noted that the function $e^{\Lambda(t-t_0)}$ yields a matrix upon evaluation, which in linear systems theory is referred to as the state transition matrix. One can represent this function of a matrix in series form as:

$$e^{\Lambda t} = \sum_{p=0}^{\infty}\frac{\Lambda^p t^p}{p!} \quad \text{Eq. 3-5}$$

As the exponential is an entire function in the complex plane, then the series in equation 3-5 converges for all complex 2×2 matrices.

Evaluation of the exponential function of the matrix $\Lambda$ may be accomplished in closed form by employing the spectral resolution theorem:

Spectral Resolution Theorem:

If A is a member of the set of n×n complex matrices, $f$ is a function defined on the spectrum of A, $f_k^{(j)}$ is the value of the $j^{th}$ derivative of $f$ at the eigenvalue $\lambda_k$ (k=1, 2 ..., s, j=0, ... $m_k$−1), and $m_k$ is the index of $\lambda_k$, then there exists matrices $Z_{kj}$, independent of $f$, such that:

$$F(A) = \sum_{k=1}^{s}\sum_{j=1}^{m_k} f_k^{(j-1)} Z_{kj} \quad \text{Eq. 3-6}$$

Moreover, the matrices $Z_{kj}$ are linearly independent n×n complex matrices and commute with A.

Recall that the index $m_k$ of an eigenvalue $\lambda_k$ of the matrix $\Lambda$ is the power of the term $(\lambda-\lambda_k)^{m_k}$ appearing in the minimal annihilating polynomial of $\Lambda$.

Successful application of this theorem requires that one first:

Determine the eigenvalues of the matrix $\Lambda$.

Compute the matrices $Z_{kj}$.

The eigenvalues are determined via the characteristic equation:

$$\det\left|\begin{pmatrix}\Gamma_1 - \lambda & \Gamma_2\\\Gamma_4 & \Gamma_5 - \lambda\end{pmatrix}\right| = 0 \quad \text{Eq. 3-7}$$

The resulting characteristic equation is quadratic:

$$\lambda^2 - (\Gamma_1+\Gamma_5)\lambda + (\Gamma_1\Gamma_5 - \Gamma_2\Gamma_4) = 0$$

One finds the eigenvalues to be:

$$\lambda_1 = \frac{(\Gamma_1+\Gamma_5) + \sqrt{(\Gamma_1+\Gamma_5)^2 - 4(\Gamma_1\Gamma_5 - \Gamma_2\Gamma_4)}}{2} \quad \text{Eq. 3-8a}$$

$$\lambda_2 = \frac{(\Gamma_1+\Gamma_5) - \sqrt{(\Gamma_1+\Gamma_5)^2 - 4(\Gamma_1\Gamma_5 - \Gamma_2\Gamma_4)}}{2} \quad \text{Eq. 3-8b}$$

This results in three distinct cases depending on the sign of the discriminant D:

$$D = (\Gamma_1+\Gamma_5)^2 - 4(\Gamma_1\Gamma_5 - \Gamma_2\Gamma_4) \quad \text{Eq. 3-9}$$

Case 1: D>0 Two distinct real eigenvalues

Case 2: D<0 Two distinct complex conjugate eigenvalues

Case 3: D=0 One repeated real eigenvalue

The function $e^{\Lambda t}$ is known for each of these cases:

Case 1: $D > 0$ Two distinct real eigenvalues  Eq. 3-10a $$e^{\Lambda(t-t_0)} = \frac{e^{\alpha(t-t_0)}}{\beta}\begin{pmatrix}\beta\cosh(\beta(t-t_0)) + \varepsilon\sinh(\beta(t-t_0)) & \Gamma_2\sinh(\beta(t-t_0))\\\Gamma_4\sinh(\beta(t-t_0)) & \beta\cosh(\beta(t-t_0)) - \varepsilon\sinh(\beta(t-t_0))\end{pmatrix}$$

$$\alpha = \frac{1}{2}(\Gamma_1+\Gamma_5) \quad \text{Eq. 3-10b}$$

$$\beta = \frac{1}{2}\sqrt{(\Gamma_1+\Gamma_5)^2 - 4(\Gamma_1\Gamma_5 - \Gamma_2\Gamma_4)} \quad \text{Eq. 3-10c}$$

$$\varepsilon = \frac{1}{2}(\Gamma_1 - \Gamma_5) \quad \text{Eq. 3-10d}$$

Case 2: $D < 0$ Two distinct complex conjugate eigenvalues  Eq. 3-11a $$e^{\Lambda(t-t_0)} = \frac{e^{\alpha(t-t_0)}}{\tilde{\beta}} \begin{pmatrix} \tilde{\beta}\cos(\tilde{\beta}(t-t_0)) + & \\ \varepsilon\sin(\tilde{\beta}(t-t_0)) & \Gamma_2\sinh(\tilde{\beta}(t-t_0)) \\ \Gamma_4\sinh(\tilde{\beta}(t-t_0)) & \tilde{\beta}\cos(\tilde{\beta}(t-t_0)) - \\ & \varepsilon\sin(\tilde{\beta}(t-t_0)) \end{pmatrix}$$

$$\tilde{\beta} = \frac{1}{2}\sqrt{-(\Gamma_1+\Gamma_5)^2 + 4(\Gamma_1\Gamma_5 - \Gamma_2\Gamma_4)} \quad \text{Eq. 3-11b}$$

Case 3: $D = 0$ One repeated real eigenvalue  Eq. 3-12

$$e^{\Lambda(t-t_0)} = e^{\alpha(t-t_0)}\begin{pmatrix} 1+\varepsilon(t-t_0) & \Gamma_2(t-t_0) \\ \Gamma_4(t-t_0) & 1+\varepsilon(t-t_0) \end{pmatrix}$$

Hence, the approximate solution is by case:

Case 1: $D > 0$ Two distinct real eigenvalues  Eq. 3-13

$$\vec{s}(t) = \frac{e^{\alpha(t-t_0)}}{\beta}\begin{pmatrix} \beta\cosh(\beta(t-t_0)) + & \\ \varepsilon\sinh(\beta(t-t_0)) & \Gamma_2\sinh(\beta(t-t_0)) \\ \Gamma_4\sinh(\beta(t-t_0)) & \beta\cosh(\beta(t-t_0)) - \\ & \varepsilon\sinh(\beta(t-t_0)) \end{pmatrix}\vec{s}(t_0) +$$

$$\int_{t_0}^t \frac{e^{\alpha(t-\varsigma)}}{\beta}\begin{pmatrix} \beta\cosh(\beta(t-\varsigma)) + & \\ \varepsilon\sinh(\beta(t-\varsigma)) & \Gamma_2\sinh(\beta(t-\varsigma)) \\ \Gamma_4\sinh(\beta(t-\varsigma)) & \beta\cosh(\beta(t-\varsigma)) - \\ & \varepsilon\sinh(\beta(t-\varsigma)) \end{pmatrix}\vec{F}d\varsigma$$

Hence, expanding terms $$\vec{s}(t) = \quad \text{Eq. 3-14}$$

$$\frac{e^{\alpha(t-t_0)}}{\beta}\left(\begin{bmatrix} \beta\cosh(\beta(t-t_0)) + \\ \varepsilon\sinh(\beta(t-t_0)) \end{bmatrix}x_0 + [\Gamma_2\sinh(\beta(t-t_0))]y_0 \\ [\Gamma_4\sinh(\beta(t-t_0))]x_0 + \begin{bmatrix} \beta\cosh(\beta(t-t_0)) - \\ \varepsilon\sinh(\beta(t-t_0)) \end{bmatrix}y_0 \end{bmatrix}\right) +$$

$$\int_{t_0}^t \left(\frac{e^{\alpha(t-\varsigma)}}{\beta}\right)$$

$$\left(\begin{bmatrix} \beta\cosh(\beta(t-\varsigma)) + \\ \varepsilon\sinh(\beta(t-\varsigma)) \end{bmatrix}\Gamma_3 + [\Gamma_2\sinh(\beta(t-\varsigma))]\Gamma_6 \\ [\Gamma_4\sinh(\beta(t-\varsigma))]\Gamma_3 + \begin{bmatrix} \beta\cosh(\beta(t-\varsigma)) - \\ \varepsilon\sinh(\beta(t-\varsigma)) \end{bmatrix}\Gamma_6 \end{bmatrix}\right)d\varsigma$$

Observe that one may rewrite the integral in equation 3-14 to obtain:

$$\vec{s}(t) = \quad \text{Eq. 3-15}$$

$$\frac{e^{\alpha(t-t_0)}}{\beta}\left(\begin{bmatrix} \beta\cosh(\beta(t-t_0)) + \\ \varepsilon\sinh(\beta(t-t_0)) \end{bmatrix}x_0 + [\Gamma_2\sinh(\beta(t-t_0))]y_0 \\ [\Gamma_4\sinh(\beta(t-t_0))]x_0 + \begin{bmatrix} \beta\cosh(\beta(t-t_0)) - \\ \varepsilon\sinh(\beta(t-t_0)) \end{bmatrix}y_0 \end{bmatrix}\right) +$$

$$\int_0^{t-t_0}\left(\frac{e^{\alpha z}}{\beta}\right)\begin{pmatrix} [\beta\Gamma_3\cosh(\beta z)] + [(\varepsilon\Gamma_3+\Gamma_2\Gamma_6)\sinh(\beta z)] \\ [\beta\Gamma_6\cosh(\beta z)] + [(\Gamma_4\Gamma_3-\varepsilon\Gamma_6)\sinh(\beta z)] \end{pmatrix}dz$$

Direct integration establishes that:

$$\int e^{\alpha z}\cosh(\beta z)dz = \quad \text{Eq. 3-16a}$$

$$\frac{1}{2}\int e^{(\alpha+\beta)z}dz + \frac{1}{2}\int e^{(\alpha-\beta)z}dz = \frac{e^{(\alpha+\beta)z}}{2(\alpha+\beta)} + \frac{e^{(\alpha-\beta)z}}{2(\alpha-\beta)}$$

$$\int e^{\alpha z}\sinh(\beta z)dz = \quad \text{Eq. 3-16b}$$

$$\frac{1}{2}\int e^{(\alpha+\beta)z}dz - \frac{1}{2}\int e^{(\alpha-\beta)z}dz = \frac{e^{(\alpha+\beta)z}}{2(\alpha+\beta)} - \frac{e^{(\alpha-\beta)z}}{2(\alpha-\beta)}$$

Substituting equations 3-16a and 3-16b into 3-15 yields:

$$\vec{s}(t) = \frac{e^{\alpha(t-t_0)}}{\beta}\left(\begin{bmatrix} \beta\cosh(\beta(t-t_0)) + \\ \varepsilon\sinh(\beta(t-t_0)) \end{bmatrix}x_0 + [\Gamma_2\sinh(\beta(t-t_0))]y_0 \\ [\Gamma_4\sinh(\beta(t-t_0))]x_0 + \begin{bmatrix} \beta\cosh(\beta(t-t_0)) - \\ \varepsilon\sinh(\beta(t-t_0)) \end{bmatrix}y_0 \end{bmatrix}\right) + \quad \text{Eq. 3-17}$$

$$\begin{pmatrix} \Gamma_3\left[\frac{e^{(\alpha+\beta)z}}{2(\alpha+\beta)} + \frac{e^{(\alpha-\beta)z}}{2(\alpha-\beta)}\right]_0^{t-t_0} + \frac{(\varepsilon\Gamma_3+\Gamma_2\Gamma_6)}{\beta}\left[\frac{e^{(\alpha+\beta)z}}{2(\alpha+\beta)} - \frac{e^{(\alpha-\beta)z}}{2(\alpha-\beta)}\right]_0^{t-t_0} \\ \Gamma_6\left[\frac{e^{(\alpha+\beta)z}}{2(\alpha+\beta)} + \frac{e^{(\alpha-\beta)z}}{2(\alpha-\beta)}\right]_0^{t-t_0} + \frac{(\Gamma_4\Gamma_3-\varepsilon\Gamma_6)}{\beta}\left[\frac{e^{(\alpha+\beta)z}}{2(\alpha+\beta)} - \frac{e^{(\alpha-\beta)z}}{2(\alpha-\beta)}\right]_0^{t-t_0} \end{pmatrix}$$

Consequently, the solution to Case 1 (D>0 two distinct real eigenvalues) is:

$$\vec{s}(t) = \frac{e^{\alpha(t-t_0)}}{\beta} \left( \begin{bmatrix} \beta\cosh(\beta(t-t_0)) + \\ \varepsilon\sinh(\beta(t-t_0)) \end{bmatrix} x_0 + [\Gamma_2\sinh(\beta(t-t_0))]y_0 \\ [\Gamma_4\sinh(\beta(t-t_0))]x_0 + \begin{bmatrix} \beta\cosh(\beta(t-t_0)) - \\ \varepsilon\sinh(\beta(t-t_0)) \end{bmatrix} y_0 \end{bmatrix} \right) +$$

$$\left( \begin{matrix} \Gamma_3 \left[ \frac{e^{(\alpha+\beta)(t-t_0)}}{2(\alpha+\beta)} + \frac{e^{(\alpha-\beta)(t-t_0)}}{2(\alpha-\beta)} \right] + \frac{(\varepsilon\Gamma_3 + \Gamma_2\Gamma_6)}{\beta} \left[ \frac{e^{(\alpha+\beta)z}}{2(\alpha+\beta)} - \frac{e^{(\alpha-\beta)z}}{2(\alpha-\beta)} \right] - \frac{\Gamma_3}{2}\left[\frac{1}{(\alpha+\beta)} + \frac{1}{(\alpha-\beta)}\right] - \\ \frac{(\varepsilon\Gamma_3 + \Gamma_2\Gamma_6)}{\beta}\left[\frac{1}{(\alpha+\beta)} + \frac{1}{(\alpha-\beta)}\right] \\ \Gamma_6 \left[ \frac{e^{(\alpha+\beta)(t-t_0)}}{2(\alpha+\beta)} + \frac{e^{(\alpha-\beta)(t-t_0)}}{2(\alpha-\beta)} \right] + \frac{(\Gamma_4\Gamma_3 - \varepsilon\Gamma_6)}{\beta}\left[ \frac{e^{(\alpha+\beta)(t-t_0)}}{2(\alpha+\beta)} - \frac{e^{(\alpha-\beta)(t-t_0)}}{2(\alpha-\beta)} \right] - \frac{\Gamma_3}{2}\left[\frac{1}{(\alpha+\beta)} + \frac{1}{(\alpha-\beta)}\right] - \\ \frac{(\Gamma_4\Gamma_3 - \varepsilon\Gamma_6)}{\beta}\left[\frac{1}{(\alpha+\beta)} + \frac{1}{(\alpha-\beta)}\right] \end{matrix} \right)$$

Eq. 3-18

Case 2: D<0 Two distinct complex conjugate eigenvalues
Given the analogy between equations 3-10a and 3-11a, one may write immediately via analogy with equation 3-15:

$$\vec{s}(t) = \frac{e^{\alpha(t-t_0)}}{\tilde{\beta}} \left( \begin{bmatrix} \tilde{\beta}\cos(\tilde{\beta}(t-t_0)) + \\ \varepsilon\sin(\tilde{\beta}(t-t_0)) \end{bmatrix} x_0 + [\Gamma_2\sin(\tilde{\beta}(t-t_0))]y_0 \\ [\Gamma_4\sin(\tilde{\beta}(t-t_0))]x_0 + \begin{bmatrix} \tilde{\beta}\cos(\tilde{\beta}(t-t_0)) - \\ \varepsilon\sin(\tilde{\beta}(t-t_0)) \end{bmatrix} y_0 \end{bmatrix} \right) +$$

$$\int_0^{t-t_0} \left( \frac{e^{\alpha z}}{\tilde{\beta}} \right) \begin{pmatrix} [\tilde{\beta}\Gamma_3\cos(\tilde{\beta}z)] + [(\varepsilon\Gamma_3 + \Gamma_2\Gamma_6)\sin(\tilde{\beta}z)] \\ [\tilde{\beta}\Gamma_6\cos(\tilde{\beta}z)] + [(\Gamma_4\Gamma_3 - \varepsilon\Gamma_6)\sin(\tilde{\beta}z)] \end{pmatrix} dz$$

Eq. 3-19

One can show that $$\int e^{\alpha z}\cos(\tilde{\beta}z)dz = \frac{e^{\alpha z}(\alpha\cos(\tilde{\beta}z) + \tilde{\beta}\sin(\tilde{\beta}z))}{\alpha^2 + \tilde{\beta}^2}$$

Eq. 3-20a $$\int e^{\alpha z}\sin(\tilde{\beta}z)dz = \frac{e^{\alpha z}(\alpha\sin(\tilde{\beta}z) - \tilde{\beta}\cos(\tilde{\beta}z))}{\alpha^2 + \tilde{\beta}^2}$$

Eq. 3-20b

Substituting equations 3-20a and 3-20b into 3-19 yields:

$$\vec{s}(t) = \frac{e^{\alpha(t-t_0)}}{\tilde{\beta}} \left( \begin{bmatrix} \tilde{\beta}\cos(\tilde{\beta}(t-t_0)) + \\ \varepsilon\sin(\tilde{\beta}(t-t_0)) \end{bmatrix} x_0 + [\Gamma_2\sin(\tilde{\beta}(t-t_0))]y_0 \\ [\Gamma_4\sin(\tilde{\beta}(t-t_0))]x_0 + \begin{bmatrix} \tilde{\beta}\cos(\tilde{\beta}(t-t_0)) - \\ \varepsilon\sin(\tilde{\beta}(t-t_0)) \end{bmatrix} y_0 \end{bmatrix} \right) +$$

Eq. 3-21

$$\left( \begin{matrix} \Gamma_3 \left[ \frac{e^{\alpha z}(\alpha\cos(\tilde{\beta}z) + \tilde{\beta}\sin(\tilde{\beta}z))}{\alpha^2 + \tilde{\beta}^2} \right]_0^{t-t_0} + \frac{(\varepsilon\Gamma_3 + \Gamma_2\Gamma_6)}{\tilde{\beta}} \left[ \frac{e^{\alpha z}(\alpha\sin(\tilde{\beta}z) - \tilde{\beta}\cos(\tilde{\beta}z))}{\alpha^2 + \tilde{\beta}^2} \right]_0^{t-t_0} \\ \Gamma_6 \left[ \frac{e^{\alpha z}(\alpha\cos(\tilde{\beta}z) + \tilde{\beta}\sin(\tilde{\beta}z))}{\alpha^2 + \tilde{\beta}^2} \right]_0^{t-t_0} + \frac{(\Gamma_4\Gamma_3 - \varepsilon\Gamma_6)}{\tilde{\beta}} \left[ \frac{e^{\alpha z}(\alpha\sin(\tilde{\beta}z) - \tilde{\beta}\cos(\tilde{\beta}z))}{\alpha^2 + \tilde{\beta}^2} \right]_0^{t-t_0} \end{matrix} \right)$$

Hence, one finds the solution for Case 2 (D<0 Two distinct complex conjugate eigenvalues) to be:

$$s(t) = \frac{e^{\alpha(t-t_0)}}{\tilde{\beta}}$$  Eq. 3-22

$$\begin{pmatrix} [\tilde{\beta}\cos(\tilde{\beta}(t-t_0)) + \varepsilon\sin(\tilde{\beta}(t-t_0))]x_0 + [\Gamma_2\sin(\tilde{\beta}(t-t_0))]y_0 \\ [\Gamma_4\sin(\tilde{\beta}(t-t_0))]x_0 + [\tilde{\beta}\cos(\tilde{\beta}(t-t_0)) - \varepsilon\sin(\tilde{\beta}(t-t_0))]y_0 \end{pmatrix} +$$

$$\begin{pmatrix} \Gamma_3\left[\dfrac{e^{\alpha z}(\alpha\cos(\tilde{\beta}(t-t_0)) + \tilde{\beta}\sin(\tilde{\beta}(t-t_0)))}{\alpha^2+\tilde{\beta}^2}\right] + \\ \dfrac{(\varepsilon\Gamma_3+\Gamma_2\Gamma_6)}{\tilde{\beta}}\left[\dfrac{e^{\alpha z}(\alpha\sin(\tilde{\beta}(t-t_0)) - \tilde{\beta}\cos(\tilde{\beta}(t-t_0)))}{\alpha^2+\beta^2}\right] - \\ \dfrac{\Gamma_3}{\alpha_2+\tilde{\beta}^2} - \dfrac{(\varepsilon\Gamma_3+\Gamma_2\Gamma_6)}{\tilde{\beta}(\alpha^2+\tilde{\beta}^2)} \\ \Gamma_6\left[\dfrac{e^{\alpha z}(\alpha\cos(\tilde{\beta}(t-t_0)) + \tilde{\beta}\sin(\tilde{\beta}(t-t_0)))}{\alpha^2+\tilde{\beta}^2}\right] + \\ \dfrac{(\Gamma_4\Gamma_3-\varepsilon\Gamma_6)}{\tilde{\beta}}\left[\dfrac{e^{\alpha z}(\alpha\sin(\tilde{\beta}(t-t_0)) - \tilde{\beta}\cos(\tilde{\beta}(t-t_0)))}{\alpha^2+\beta^2}\right] - \\ \dfrac{\Gamma_6}{\alpha_2+\tilde{\beta}^2} - \dfrac{(\Gamma_4\Gamma_3-\varepsilon\Gamma_6)}{\tilde{\beta}(\alpha^2+\tilde{\beta}^2)} \end{pmatrix}$$

Case 3: D=0 One repeated real eigenvalue
Substituting equation 3-12 into 3-4 yields $$\vec{s}(t) = e^{\alpha(t-t_0)}\begin{pmatrix} 1+\varepsilon(t-t_0) & \Gamma_2(t-t_0) \\ \Gamma_4(t-t_0) & 1-\varepsilon(t-t_0) \end{pmatrix}\vec{s}(t_0) +$$  Eq. 3-23

$$\int_{t_0}^{t} e^{\alpha(t-\zeta)}\begin{pmatrix} 1+\varepsilon(t-\zeta) & \Gamma_2(t-\zeta) \\ \Gamma_4(t-\zeta) & 1-\varepsilon(t-\zeta) \end{pmatrix}\vec{F}d\zeta$$

Hence, one may write that;

$$\vec{s}(t) = e^{\alpha(t-t_0)}\begin{pmatrix} [1+\varepsilon(t-t_0)]x_0 + \Gamma_2(t-t_0)y_0 \\ \Gamma_4(t-t_0)x_0 + [1-\varepsilon(t-t_0)]y_0 \end{pmatrix} +$$  Eq. 3-24

$$\int_{0}^{t-t_0} e^{\alpha(t-\zeta)}\begin{pmatrix} [1+\varepsilon(t-\zeta)]\Gamma_3 + \Gamma_6\Gamma_2(t-\zeta) \\ \Gamma_3\Gamma_4(t-\zeta) + [1-\varepsilon(t-\zeta)]\Gamma_6 \end{pmatrix}d\zeta$$

A change of variables yields;

$$\vec{s}(t) = e^{\alpha(t-t_0)}\begin{pmatrix} [1+\varepsilon(t-t_0)]x_0 + \Gamma_2(t-t_0)y_0 \\ \Gamma_4(t-t_0)x_0 + [1-\varepsilon(t-t_0)]y_0 \end{pmatrix} +$$  Eq. 3-25

$$\int_{0}^{t-t_0} e^{\alpha z}\begin{pmatrix} [1+\varepsilon z]\Gamma_3 + \Gamma_6\Gamma_2 z \\ \Gamma_3\Gamma_4 z + [1-\varepsilon z]\Gamma_6 \end{pmatrix}dz$$

Consequently, $$\vec{s}(t) = e^{\alpha(t-t_0)}\begin{pmatrix} [1+\varepsilon(t-t_0)]x_0 + \Gamma_2(t-t_0)y_0 \\ \Gamma_4(t-t_0)x_0 + [1-\varepsilon(t-t_0)]y_0 \end{pmatrix} +$$  Eq. 3-26

$$\int_{0}^{t-t_0} e^{\alpha z}\begin{pmatrix} (\Gamma_3 + [\varepsilon\Gamma_3 + \Gamma_6\Gamma_2]z) \\ (\Gamma_6 + [\Gamma_3\Gamma_4 - \varepsilon\Gamma_6]z) \end{pmatrix}dz$$

Integrating by parts yields that:

$$\int e^{\alpha z}[\varepsilon\Gamma_3 + \Gamma_6\Gamma_2]z = [\varepsilon\Gamma_3 + \Gamma_6\Gamma_2]\left(\frac{\alpha z - 1}{\alpha^2}\right)e^{\alpha z}$$  Eq. 3-27a $$\int e^{\alpha z}[\Gamma_3\Gamma_4 - \varepsilon\Gamma_6]z = [\Gamma_3\Gamma_4 - \varepsilon\Gamma_6]\left(\frac{\alpha z - 1}{\alpha^2}\right)e^{\alpha z}$$  Eq. 3-27b Substituting equations 3-27a and 3-27b into 3-26 yields the solution to Case 3 (D=0 One repeated real eigenvalue):

$$\vec{s}(t) = e^{\alpha(t-t_0)}\begin{pmatrix} [1+\varepsilon(t-t_0)]x_0 + \Gamma_2(t-t_0)y_0 \\ \Gamma_4(t-t_0)x_0 + [1-\varepsilon(t-t_0)]y_0 \end{pmatrix} +$$  Eq. 3-28

$$\begin{pmatrix} \left(\dfrac{\Gamma_3}{\alpha} + [\varepsilon\Gamma_3 + \Gamma_6\Gamma_2]\left(\dfrac{\alpha(t-t_0)-1}{\alpha^2}\right)\right)e^{\alpha(t-t_0)} + \\ \left(-\dfrac{\Gamma_3}{\alpha} + \left(\dfrac{[\varepsilon\Gamma_3+\Gamma_6\Gamma_2]}{\alpha^2}\right)\right) \\ \left(\dfrac{\Gamma_6}{\alpha} + [\Gamma_3\Gamma_4 - \varepsilon\Gamma_6]\left(\dfrac{\alpha(t-t_0)-1}{\alpha^2}\right)\right)e^{\alpha(t-t_0)} + \\ \left(-\dfrac{\Gamma_6}{\alpha} + \left(\dfrac{[\Gamma_3\Gamma_4-\varepsilon\Gamma_6]}{\alpha^2}\right)\right) \end{pmatrix}$$

It should be noted that the constant scan coefficients employed in the approximate solution presented here depend on the coordinates X, Y, Z of the ground target point. For each solution, a set of ground coordinates is chosen to be used in computing $\Gamma_1, \ldots \Gamma_6$. In the case where one wishes to specify a point in the focal plane instead, one may employ the non-pinhole camera projection equations to establish where that point intersects the earth's surface (usually accomplished via iteration). The resulting ground coordinates may then be employed to compute the scan coefficients used in the approximate solution.

4 Error Propagation Model and MRC

Figure 7:
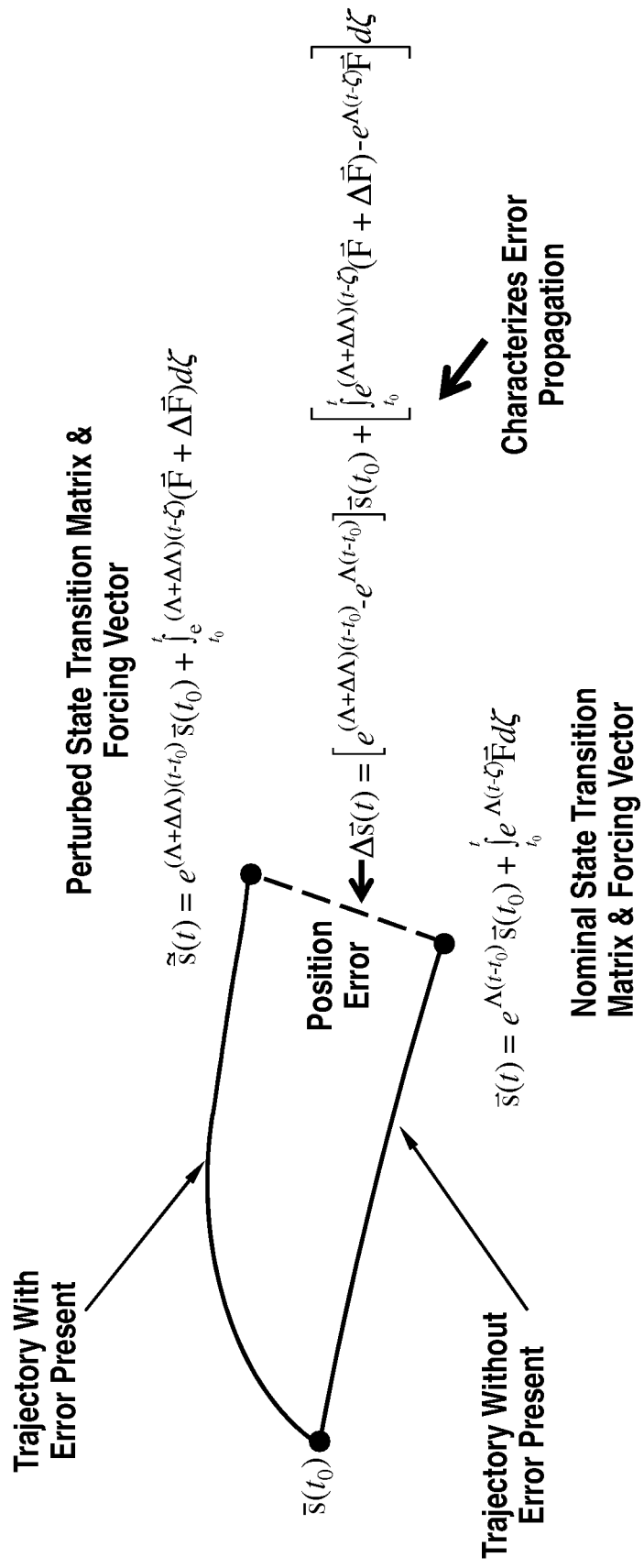
FIG. 7 is a schematic diagram of an error perturbation model, according to some exemplary embodiments.

The solution to the image scan equations is propagated in time via the state transition matrix and the forcing vector. As the scan coefficients completely determine the state transition matrix and forcing vector, any errors in image motion propagation arise from errors in the scan coefficients (within the accuracy of the constant scan coefficients assumption). Thus, the error propagation model can be constructed as indicated in FIG. 7, which is a schematic diagram of an error perturbation model, according to some exemplary embodiments. FIG. 7 illustrates a state at time $t_0$ and two possible positions at some time t after $t_0$. One of the positions is defined by the nominal state transition matrix and forcing vector provided in FIG. 7, and the other position is defined by a perturbed state transition matrix and forcing vector, also provided in FIG. 7. The difference in position between the two points is the position error, which is defined by the fundamental error propagation equation, also provided in FIG. 7 and reproduced below as Eq. 4-1a.

Thus the fundamental error propagation equation is:

$$\Delta \vec{s}(t) = [e^{(\Lambda+\Delta\Lambda)(t-t_0)} - e^{\Lambda(t-t_0)}]\vec{s}(t_0) + \qquad \text{Eq. 4-1a}$$

$$\left[\int_{t_0}^{t} e^{(\Lambda+\Delta\Lambda)(t-\zeta)}(\vec{F}+\Delta\vec{F}) - e^{\Lambda(t-\zeta)}\vec{F}\right]d\zeta$$

$$\Delta\Lambda = \begin{pmatrix} \Delta\Gamma_1 & \Delta\Gamma_2 \\ \Delta\Gamma_4 & \Delta\Gamma_5 \end{pmatrix} \qquad \text{Eq. 4-1b}$$

$$\Delta\vec{F} = \begin{pmatrix} \Delta\Gamma_3 \\ \Delta\Gamma_6 \end{pmatrix} \qquad \text{Eq. 4-1c}$$

Here $\Delta \vec{s}(t)$ represents the total error in the focal plane coordinates arising from propagating forward, from the initial conditions $\vec{s}(t_0)$, in time by $(t-t_0)$ in the presence of scan coefficient errors $\Delta\Gamma_1, \ldots, \Delta\Gamma_6$. It is noted that this approach does not require the individual estimation of linear, oscillatory and random errors, as was the case with other previous applications.

According to exemplary embodiments, a first-order error propagation model is constructed by expanding the indicated state transition matrices in equation 4-1a in time, and retaining only the first order terms:

$$e^{(\Lambda+\Delta\Lambda)t} = \sum_{p=0}^{\infty} \frac{(\Lambda+\Delta\Lambda)^p t^p}{p!} \approx I + (\Lambda+\Delta\Lambda)(t-t_0) \qquad \text{Eq. 4-2a}$$

$$e^{\Lambda(t-t_0)} = \sum_{p=0}^{\infty} \frac{(\Lambda)^p (t-t_0)^p}{p!} \approx I + \Lambda(t-t_0) \qquad \text{Eq. 4-2b}$$

Substituting equations 4-2a and 4-2b into 4-1 and retaining only first order terms in the scan coefficient errors $\Delta\Gamma_1, \ldots, \Delta\Gamma_6$ yields:

$$\Delta \vec{s}(t) = [\Delta\Lambda(t-t_0)]\vec{s}(t_0) + [\Delta\vec{F}(t-t_0)] + \qquad \text{Eq. 4-3}$$

$$\frac{1}{2}[(\Delta\Lambda)\vec{F} + \Lambda(\Delta\vec{F})](t-t_0)^2$$

It can be observed from equation 4-3 that the focal plane coordinate errors vary with propagation time. The longer the propagation time, the larger the resulting focal plane errors will be. This trend has significant practical impacts for line scanning sensors with slow line rates, or where the separation between the leading and trailing detector arrays 12, 16 is large.

Thus, according to the disclosure, an equation has been derived that predicts focal plane coordinate errors in terms of propagation time and scan coefficient errors. This equation is most useful if one has knowledge of the scan coefficient errors. The detector junction measurements can be utilized to derive the desired scan coefficients errors. Specifically, equation 4-3 will be rewritten to establish a measurement sensitivity matrix, which relates the errors in the scan coefficients to the detector junction measured coordinate differences (between the predicted and correlation-determined positions).

Equation 4-3 is expanded in terms of the individual scan coefficient errors $\Delta\Gamma_1, \ldots, \Delta\Gamma_6$ and terms are rearranged to obtain:

$$\Delta \vec{s}(t) = H_{2\times 6}\Delta\vec{\Gamma}_{6\times 1} = \qquad \text{Eq. 4-4a}$$

$$\begin{pmatrix} H_{11} & H_{12} & H_{13} & H_{14} & H_{15} & H_{16} \\ H_{21} & H_{22} & H_{23} & H_{24} & H_{25} & H_{26} \end{pmatrix} \begin{pmatrix} \Delta\Gamma_1 \\ \Delta\Gamma_2 \\ \Delta\Gamma_3 \\ \Delta\Gamma_4 \\ \Delta\Gamma_5 \\ \Delta\Gamma_6 \end{pmatrix}$$

$$H_{11} = \left[x_0(t-t_0) + \Gamma_1 \frac{(t-t_0)^2}{2}\right] \qquad \text{Eq. 4-4b}$$

$$H_{12} = y_0(t-t_0) + \frac{\Gamma_6}{2}(t-t_0)^2 \qquad \text{Eq. 4-4c}$$

$$H_{13} = (t-t_0) + \frac{\Gamma_1}{2}(t-t_0)^2 \qquad \text{Eq. 4-4d}$$

$$H_{14} = 0 \qquad \text{Eq. 4-4e}$$

$$H_{15} = 0 \qquad \text{Eq. 4-4f}$$

$$H_{16} = \Gamma_2(t-t_0)^2/2 \qquad \text{Eq. 4-4g}$$

$$H_{21} = 0 \qquad \text{Eq. 4-4h}$$

$$H_{22} = 0 \qquad \text{Eq. 4-4i}$$

$$H_{23} = \frac{\Gamma_4}{2}(t-t_0)^2 \qquad \text{Eq. 4-4j}$$

$$H_{24} = x_0(t-t_0) + \Gamma_3 \frac{(t-t_0)^2}{2} \qquad \text{Eq. 4-4k}$$

$$H_{25} = y_0(t-t_0) + \Gamma_6 \frac{(t-t_0)^2}{2} \qquad \text{Eq. 4-4l}$$

$$H_{26} = (t-t_0) + \Gamma_5 \frac{(t-t_0)^2}{2} \qquad \text{Eq. 4-4m}$$

At this point one assumes the scan coefficient errors to be constant across an image line, and then employs equations 4-4a through 4-4m to execute a least-squares estimate of these scan errors given sufficient detector junction measurements $\Delta \vec{s}_j(t)$ j=1 . . . m to over determine the system. It is noted that only the initial condition $\vec{s}_j(t_0)$ j=1 . . . , m and the scan coefficients $\Delta\Gamma_{1j}, \ldots, \Delta\Gamma_{6j}$ j=1 . . . , m vary from detector junction to junction. Thus the least squares solution becomes:

$$\Delta\vec{\Gamma}_{6\times 1} = (H^T_{6\times 2m} H_{2m\times 6})^{-1} H^T_{6\times 2m} \begin{pmatrix} \Delta \vec{s}_1(t) \\ \vdots \\ \Delta \vec{s}_m(t) \end{pmatrix}_{2m\times 1} \qquad \text{Eq. 4-5a}$$

$$\Delta \vec{s}_j(t) = \begin{pmatrix} \Delta x_j \\ \Delta y_j \end{pmatrix} \qquad \text{Eq. 4-5b}$$

It is noted that equation 4-5a is only valid when the indicated matrix inversion exists. In the event that the matrix is not invertible for a particular line, this line would have its total motion error correction by interpolating the closest lines that yielded successful solutions.

Figure 8:
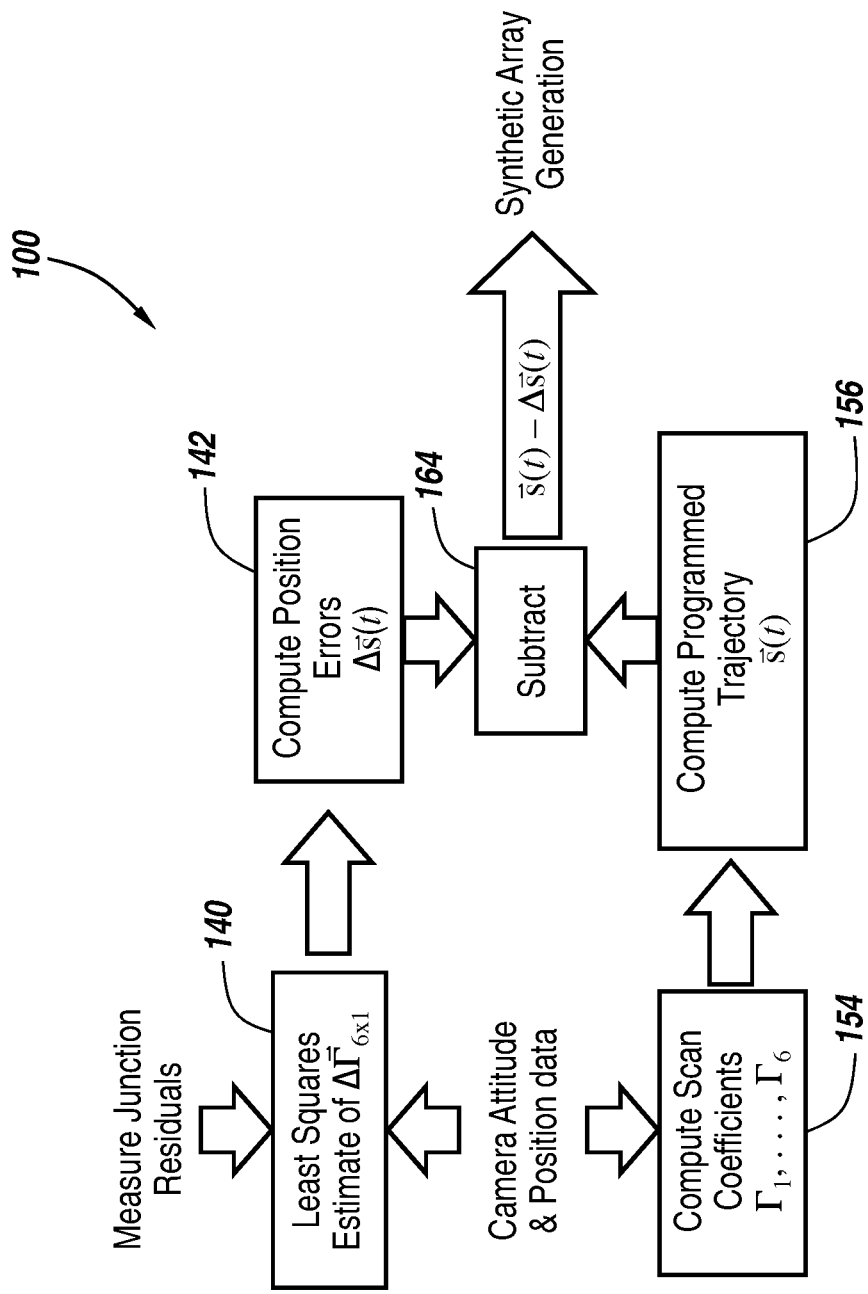
FIG. 8 includes a schematic block diagram of an MRC process, according to some exemplary embodiments.

FIG. 8 includes a schematic block diagram of the MRC process described in detail in the foregoing text. Given the estimate of the scan coefficient errors on a line-by-line basis, the MRC correction process of the disclosure can be implemented as depicted in FIG. 8. According to the process, total motion error is removed prior to synthetic array generation. Referring to FIG. 8, a least squares estimate of $\Delta \bar{\Gamma}_{6 \times 1}$ at 140, is computed using camera attitude and position data and measured junction residuals. Using the least squares estimate, position errors are computed at 142. Scan coefficients are computed at 154, also using the camera attitude and position data. The programmed trajectory is computed at 156 using the computed scan coefficients. The position errors computed at 142 are subtracted at 164 from the programmed trajectory computed in 156 to generate the synthetic array.

$$\Delta \vec{s}(t) = H_{2 \times 6} \Delta \bar{\Gamma}_{6 \times 1} == H_{2 \times 6} D_{6 \times 15} \Delta \bar{\Psi}_{15 \times 1} \quad \text{Eq. 6-1a}$$

$$D_{6 \times 15} = \begin{pmatrix} \frac{\partial \Gamma_1}{\partial \omega} & \frac{\partial \Gamma_1}{\partial \phi} & \frac{\partial \Gamma_1}{\partial \kappa} & \frac{\partial \Gamma_1}{\partial \dot{\omega}} & \frac{\partial \Gamma_1}{\partial \dot{\phi}} & \frac{\partial \Gamma_1}{\partial \dot{\kappa}} & \frac{\partial \Gamma_1}{\partial X} & \frac{\partial \Gamma_1}{\partial Y} & \frac{\partial \Gamma_1}{\partial Z} & \frac{\partial \Gamma_1}{\partial X_c} & \frac{\partial \Gamma_1}{\partial Y_c} & \frac{\partial \Gamma_1}{\partial Z_c} & \frac{\partial \Gamma_1}{\partial \dot{X}_c} & \frac{\partial \Gamma_1}{\partial \dot{Y}_c} & \frac{\partial \Gamma_1}{\partial \dot{Z}_c} \\ \vdots & \vdots & \vdots & \vdots & \vdots & \vdots & \vdots & \vdots & \vdots & \vdots & \vdots & \vdots & \vdots & \vdots & \vdots \\ \frac{\partial \Gamma_6}{\partial \omega} & \frac{\partial \Gamma_6}{\partial \phi} & \frac{\partial \Gamma_6}{\partial \kappa} & \frac{\partial \Gamma_6}{\partial \dot{\omega}} & \frac{\partial \Gamma_6}{\partial \dot{\phi}} & \frac{\partial \Gamma_6}{\partial \dot{\kappa}} & \frac{\partial \Gamma_6}{\partial X} & \frac{\partial \Gamma_6}{\partial Y} & \frac{\partial \Gamma_6}{\partial Z} & \frac{\partial \Gamma_6}{\partial X_c} & \frac{\partial \Gamma_6}{\partial Y_c} & \frac{\partial \Gamma_6}{\partial Z_c} & \frac{\partial \Gamma_6}{\partial \dot{X}_c} & \frac{\partial \Gamma_6}{\partial \dot{Y}_c} & \frac{\partial \Gamma_6}{\partial \dot{Z}_c} \end{pmatrix} \quad \text{Eq. 6-1b}$$

$$\Delta \bar{\Psi}_{15 \times 1} = \begin{pmatrix} \Delta \omega \\ \vdots \\ \Delta \dot{Z}_c \end{pmatrix}_{15 \times 1} \quad \text{Eq. 6-1c}$$

5 Covariance Error Model

According to exemplary embodiments, an error model has been developed that relates a given set of scan coefficient errors to the resulting focal plane coordinate errors. Considering the scan coefficient errors to be random variables with a known joint probability distribution, expressions for the mean and covariance of the resulting focal plane coordinate errors are obtained. These expressions are referred to herein as the covariance model.

Define the expectation operation $\langle \ \rangle$ with respect to the joint probability distribution $p(\Delta \Gamma_1, \ldots, \Delta \Gamma_6)$ via:

$$\langle f(\Delta \Gamma_1, \ldots, \Delta \Gamma_6) \rangle = \iiiint f(\Delta \Gamma_1, \ldots, \Delta \Gamma_6) p(\Delta \Gamma_1, \ldots, \Delta \Gamma_6) d(\Delta \Gamma_1) \ldots d(\Delta \Gamma_6) \quad \text{Eq. 5-1}$$

This expectation operator will now be employed to compute the desired mean and covariance of the focal plane coordinate errors. Hence, applying the expectation operator to equation 4-4a yields the mean error $\langle \Delta \vec{s}(t) \rangle$ to be:

$$\langle \Delta \vec{s}(t) \rangle = H_{2 \times 6} \langle \Delta \bar{\Gamma}_{6 \times 1} \rangle \quad \text{Eq. 5-2}$$

Likewise one can compute the covariance $\mathbf{P}_{\Delta \vec{s}}$ of the focal plane coordinate errors via:

$$\mathbf{P}_{\Delta \vec{s}} = \langle (\Delta \vec{s}(t) - \langle \Delta \vec{s}(t) \rangle)(\Delta \vec{s}(t) - \langle \Delta \vec{s}(t) \rangle)^T \rangle \quad \text{Eq. 5-3a}$$

$$\mathbf{P}_{\Delta \vec{s}} = H_{2 \times 6} \langle \Delta \bar{\Gamma}_{6 \times 1} \Delta \bar{\Gamma}^T_{1 \times 6} \rangle H^T_{6 \times 2} - H_{2 \times 6} \langle \Delta \bar{\Gamma}_{6 \times 1} \rangle \langle \Delta \bar{\Gamma}^T_{1 \times 6} \rangle H^T_{6 \times 2} \quad \text{Eq. 5-3b}$$

$$\mathbf{P}_{\Delta \vec{s}} = H_{2 \times 6} P_{\Delta \Gamma} H^T_{6 \times 2} \quad \text{Eq. 5-3c}$$

Here $P_{\Delta \Gamma}$ is the 6×6 covariance matrix of the scan coefficient errors. A representative scan coefficient covariance is computed by employing a sufficient number of the line-to-line individual scan coefficient error vectors from the least squares process via a "moving window" approach.

While the covariance model does not appear directly in the MRC process equations, it is important to being able to execute "on the-fly" statistical consistence checks and detection junction measurement outlier rejection.

6 Platform Error Inversion Process

The estimated errors in the scan coefficients are related on a line-by-line basis to knowledge errors in the fifteen parameters of the platform support data (sensor position (3) and velocity (3), attitude angles (3) and rates (3), ground point location (3)). It is assumed that the underlying platform parameter knowledge errors are constant across an image line. One then employs all the valid junction measurements for a particular line and then inverts the first-order error model via an over determined least squares process as follows. Specifically, at each detector junction one has:

One can employ all the valid junction measurement for a particular line to write:

$$\begin{pmatrix} \Delta \vec{s}_1 \\ \Delta \vec{s}_2 \\ \vdots \\ \Delta \vec{s}_M \end{pmatrix} = \begin{pmatrix} {}_1 H_1 D \\ {}_2 H_2 D \\ \vdots \\ {}_M H_M D \end{pmatrix}_{2M \times 15} \begin{pmatrix} \Delta \omega \\ \vdots \\ \Delta \dot{Z}_c \end{pmatrix}_{15 \times 1} \quad \text{Eq. 6-2a}$$

$$\Delta \vec{S}_{2M \times 1} = \Theta_{2M \times 15} \Delta \Psi_{15 \times 1} \quad \text{Eq. 6-2b}$$

The resulting least squares solution over m valid junctions is:

$$\Delta \bar{\Psi}_{15 \times 1} = \{(\Theta^T \Theta)^{-1} \Theta^T\}_{15 \times 2M} \Delta \vec{S}_{2m \times 1} \quad \text{Eq. 6-3a}$$

$$\Theta_{2M \times 15} = \begin{pmatrix} {}_1 H_1 D \\ {}_2 H_2 D \\ \vdots \\ {}_M H_M D \end{pmatrix}_{2M \times 15} \quad \text{Eq. 6-3b}$$

Hence, one can estimate the platform parameter knowledge errors on a line-by-line basis and employ these estimates along with the a priori knowledge estimates to improve the knowledge of the platform parameters throughout an image. Indeed, one can iteratively feedback these improved platform position errors to iterate the MRC correction process, thus improving overall algorithm robustness and accuracy.

7 MRC Summary Description

According to the exemplary embodiments, the MRC approach described herein in detail includes certain assumptions upon which the approach is constructed. These assumptions are:

Assumption 1: The non-pinhole camera model variations can be accurately modeled via nth-order bivariate polynomials obtained from curve fitting the non-pinhole disparities obtained from a sufficient number of ray traces. This disclosure describes quadratic bivariate polynomials for mathematical brevity and proof of concept, as an exemplary illustration only.

Assumption 2: The nonlinear scan equations can be approximated about a spatial neighborhood of any chosen initial projection point and corresponding time increment via a first order Taylor series expansion. This results in a set of linear first order differential equations. The extent of the approximation is sufficient to accurately project from the leading to the trailing array.

Assumption 3: The resulting system of coupled first-order differential equations may be integrated over the associated time increment by holding the scan coefficients constant.

Assumption 4: The error propagation characteristics of the linearized scan equations can be determined via a first-order perturbation of the state transition matrix and the associated forcing vector via additive scan coefficient errors.

Assumption 5: While the scan coefficients obtained from the linearized scan equations will vary at each detector junction, it is assumed that a single set of scan coefficient errors can be obtained across all the detector junctions via a least squares process that is consistent with the measured junction coordinate residuals.

Assumption 6: The knowledge errors in the platform support parameters can be assumed constant across an individual scan line.

Figure 9:
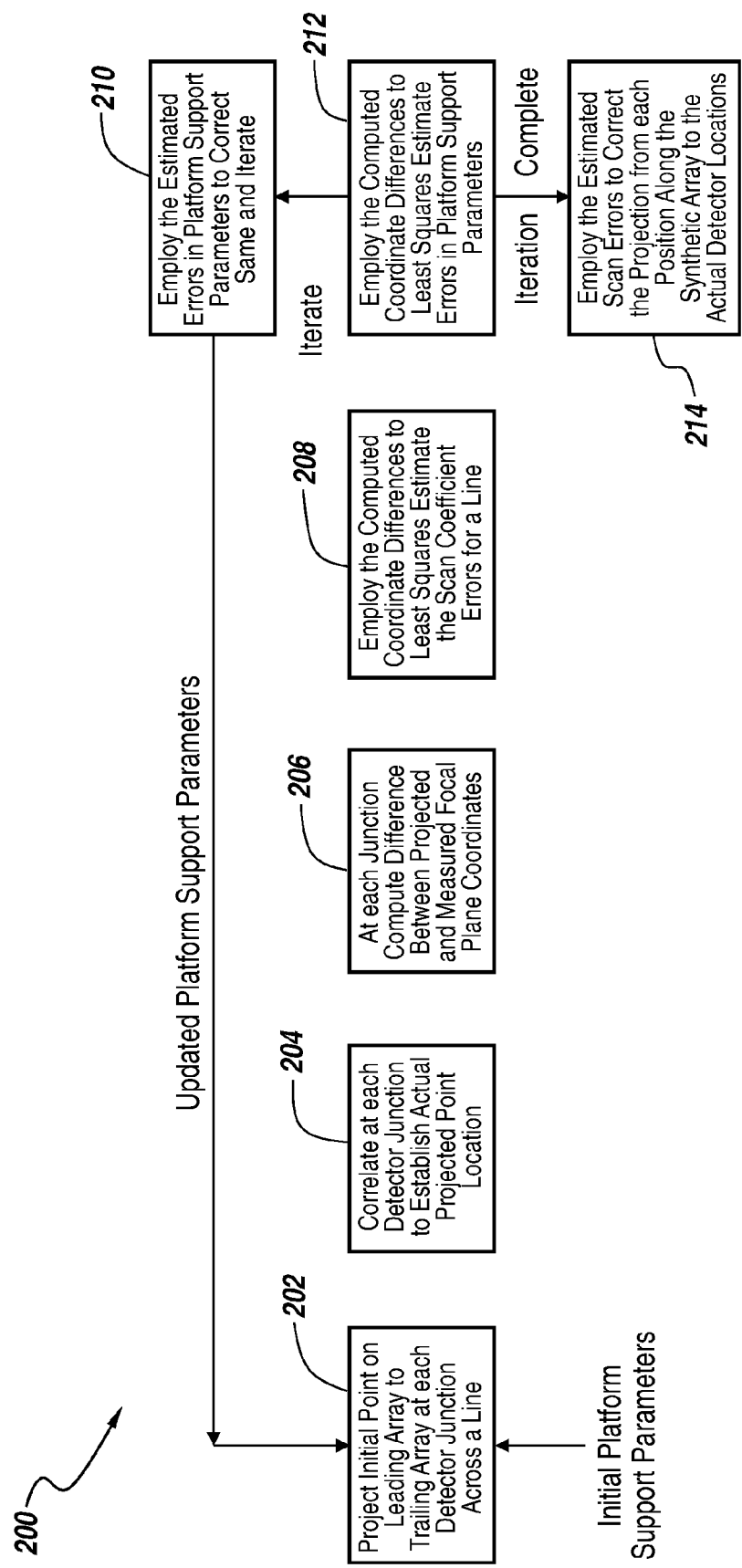
FIG. 9 includes a schematic logical flow diagram of a line-by-line MRC computational process, according to some exemplary embodiments.

FIG. 9 includes a schematic logical flow diagram of the line-by-line MRC computational process, according to some exemplary embodiments. Referring to FIG. 9, it is noted that the entire process is iterative, line-by-line. Specifically, initial platform support parameters are used in step 202 to project an initial point on the leading array to the trailing array at each detector junction across a line. Next, in step 204, correlation at each detector junction is performed to establish actual projected point location. Next, at step 206, at each junction, a difference between projected and measured focal plane coordinates is computed. Next, at step 208, the coordinate differences computed at 206 are used to estimate, for example, by least-squares estimation, the scan coefficient errors for a line. Next, in step 212, the coordinate differences computed at 206 are used to estimate, for example, by least-squares estimation, errors in platform support parameters. If another iteration is required, in step 210, the estimated errors in platform support parameters are used to correct the errors, and flow returns to step 202. In contrast, after step 212, if iteration is complete, in step 214, the estimated scan errors are used to correct the projection from each position along the synthetic array to the actual detector locations. It is noted that the iteration branch depicted in FIG. 9 is optional based on the accuracy of the estimated errors in the support parameters. It should also be noted that in some applications the rate at which the platform position, velocity, attitude angles and rates are measured by on-platform equipment may not support a line-by-line implementation. In these cases one would compute new corrections every m lines, where m is chosen to be consistent with the interpolation accuracy supported by the time sampling granularity.

Various embodiments of the above-described systems and methods may be implemented in digital electronic circuitry, in computer hardware, firmware, and/or software. The implementation can be as a computer program product (i.e., a computer program tangibly embodied in an information carrier). The implementation can, for example, be in a machine-readable storage device and/or in a propagated signal, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors and/or controllers executing a computer program to perform functions of the invention by operating on input data and generating output. Method steps can also be performed by, and an apparatus can be implemented as, special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware, e.g., a controller such as a microcontroller, that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data, e.g., magnetic, magneto-optical disks, or optical disks.

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device, e.g., a mouse or a trackball, by which the user can provide input to the computer, e.g., interact with a user interface element. Other kinds of devices can be used to provide for interaction with a user. Other devices can, for example, be feedback provided to the user in any form of sensory feedback, e.g., visual feedback, auditory feedback, or tactile feedback. Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication, e.g., a communication network. Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network, e.g., local area network (LAN), wide area network (WAN), campus area network (CAN), metropolitan area network (MAN), home area network (HAN), a private IP network, an IP private branch exchange (IPBX), a wireless network, e.g., radio access network (RAN), 802.11 network, 802.16 network, general packet radio service (GPRS) network, Hiper-LAN, and/or other packet-based networks. Circuit-based networks can include, for example, the public switched telephone network (PSTN), a private branch exchange (PBX), a wireless network, e.g., RAN, Bluetooth, code-division multiple access (CDMA) network, time division multiple access (TDMA) network, global system for mobile communications (GSM) network, and/or other circuit-based networks.

The computing system can also include one or more computing devices. A computing device can include, for example, a computer, a computer with a browser device, a telephone, an IP phone, a mobile device, e.g., cellular phone, personal digital assistant (PDA) device, laptop computer, electronic mail device, and/or other communication devices. The browser device includes, for example, a computer, e.g., desktop computer, laptop computer, with a World Wide Web browser, e.g., Microsoft® Internet Explorer® available from Microsoft Corporation, Mozilla® Firefox available from Mozilla Corporation. The mobile computing device includes, for example, a Blackberry®, iPAD®, iPhone® or other smartphone device.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present disclosure has been described with reference to exemplary embodiments, it is understood that the words that have been used herein, are words of description and illustration, rather than words of limitation. Changes may be made, within the purview of the appended claims, as presently stated and as amended, without departing from the scope and spirit of the present disclosure in its aspects.

Although the present disclosure has been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

Whereas many alterations and modifications of the disclosure will no doubt become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

The invention claimed is:

1. A method of misregistration correction in a line scanning imaging system, comprising:
   providing the line scanning imaging system with a forward array of optical detectors and a trailing array of optical detectors for receiving optical signals from a scene being scanned and converting the optical signals into electrical signals, the forward array of optical detectors receiving the optical signals at a different time than the trailing array of optical detectors receiving the optical signals, the forward array of optical detectors and the trailing array of optical detectors defining a plurality of detector junction overlap regions;
   receiving the electrical signals at a processor;
   processing the received electrical signals with the processor, the processing comprising the steps of:
      generating a model of scan motion over a focal plane of the imaging system, using a coupled system of non-linear scan equations with constant coefficients;
      estimating programmed motion positions across the plurality of detector junction overlap regions via a state transition matrix solution to the non-linear scan equations;
      at each detector junction overlap region, measuring actual motion positions via image correlation of overlapping detectors;
      generating differences between the actual motion positions and the estimated programmed motion positions;
      estimating updates to the constant coefficients based on the generated differences;
      generating corrections from the estimated updates to remove unwanted motion; and
      applying the updates to the constant coefficients; wherein
   the steps of generating a model of scan motion, estimating programmed motion positions, measuring actual motion positions, generating differences, estimating updates, generating corrections and applying the updates are performed by means of a non-transitory computer-usable medium having computer-readable code that, when executed by the processor, cause the processor to perform the steps.

2. The method of claim 1, wherein estimating updates is performed using least-squares estimation.

3. The method of claim 1, wherein the image correlation comprises normalized cross-correlation.

4. The method of claim 1, wherein the image correlation comprises lag product cross-correlation.

5. The method of claim 1, wherein the image correlation comprises least squares cross-correlation.

6. The method of claim 1, wherein the model of scan motion is generated over a predetermined time interval.

7. The method of claim 1, wherein the non-linear scan equations comprise a set of differential equations with constant coefficients.

8. The method of claim 7, wherein the differential equations are first-order differential equations.

9. The method of claim 1, further comprising computing the non-linear scan equation coefficients using sensor platform parameters.

10. The method of claim 9, wherein the sensor platform parameters comprise at least one of sensor position, velocity, attitude angles and rates.

11. The method of claim 10, further comprising approximating errors in the non-linear scan equation coefficients from measurement errors in the platform parameters.

12. The method of claim 11, further comprising generating a covariance matrix of focal plane coordinate errors.

13. The method of claim 10, further comprising estimating platform parameter errors from the differences between the actual motion positions and the estimated programmed motion positions.

* * * * *